(12) United States Patent
Citti et al.

(10) Patent No.: US 9,624,132 B2
(45) Date of Patent: Apr. 18, 2017

(54) SINTERED ZIRCON MATERIAL FOR FORMING BLOCK

(71) Applicant: SAINT-GOBAIN CERAMICS & PLASTICS, INC., Worcester, MA (US)

(72) Inventors: Olivier Citti, Wellesley, MA (US); Julien P. Fourcade, Shrewsbury, MA (US); Andrea L. Kazmierczak, Marlborough, MA (US); David J. Lechevalier, Cambridge, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/018,197

(22) Filed: Feb. 8, 2016

(65) Prior Publication Data

US 2016/0221879 A1  Aug. 4, 2016

Related U.S. Application Data

(63) Continuation of application No. 14/183,226, filed on Feb. 18, 2014, now Pat. No. 9,272,958.

(60) Provisional application No. 61/766,090, filed on Feb. 18, 2013.

(51) Int. Cl.
   *C04B 35/48* (2006.01)
   *C04B 35/626* (2006.01)

(52) U.S. Cl.
   CPC ........ *C04B 35/481* (2013.01); *C04B 35/6263* (2013.01); *C04B 2235/3217* (2013.01); *C04B 2235/3232* (2013.01); *C04B 2235/3248* (2013.01); *C04B 2235/3251* (2013.01); *C04B 2235/3272* (2013.01); *C04B 2235/3418* (2013.01); *C04B 2235/5436* (2013.01); *C04B 2235/6567* (2013.01); *C04B 2235/72* (2013.01); *C04B 2235/77* (2013.01);
(Continued)

(58) Field of Classification Search
   CPC .................................................... C04B 35/481
   USPC .......................................................... 501/106
   See application file for complete search history.

(56) References Cited

U.S. PATENT DOCUMENTS 4,542,110 A   9/1985  Nakada et al.
4,587,225 A   5/1986  Tsukuma et al.
(Continued)

FOREIGN PATENT DOCUMENTS

CN   101175704 A   5/2008
EP   0438300 A2   7/1991
(Continued)

OTHER PUBLICATIONS

International Search Report from PCT/US2014/016952 mailed May 26, 2014, 1 page.
(Continued)

*Primary Examiner* — Noah Wiese
(74) *Attorney, Agent, or Firm* — Abel Law Group, LLP; Adam Keser

(57) ABSTRACT

A component includes a body including zircon ($ZrSiO_4$) grains, the body having a free silica intergranular phase present between the zircon grains and distributed substantially uniformly through the body. The body comprises a content of free silica not greater than about 2 wt. % for the total weight of the body.

19 Claims, 7 Drawing Sheets

(52) U.S. Cl.
CPC ...... *C04B 2235/80* (2013.01); *C04B 2235/85* (2013.01); *C04B 2235/96* (2013.01)

(56) References Cited

U.S. PATENT DOCUMENTS

| | | | |
|---|---|---|---|
| 5,124,287 A * | 6/1992 | Wehrenberg | C03B 5/43 501/102 |
| 5,407,873 A | 4/1995 | Goerenz et al. | |
| 5,679,612 A | 10/1997 | Endo et al. | |
| 6,121,177 A | 9/2000 | Guigonis et al. | |
| 7,704,905 B2 | 4/2010 | Addiego et al. | |
| 7,910,508 B2 * | 3/2011 | Gaubil | C03B 5/43 501/106 |
| 8,236,719 B2 | 8/2012 | Citti et al. | |
| 8,258,068 B2 | 9/2012 | Citti et al. | |
| 2008/0160279 A1 | 7/2008 | Djuricic et al. | |
| 2008/0196449 A1 | 8/2008 | Addiego et al. | |
| 2009/0215609 A1 * | 8/2009 | Gaubil | C03B 5/43 501/103 |
| 2010/0028665 A1 * | 2/2010 | Lu | C03B 17/064 428/338 |
| 2010/0089098 A1 * | 4/2010 | Citti | C03B 5/43 65/374.13 |
| 2010/0154481 A1 | 6/2010 | Fourcade et al. | |
| 2010/0248934 A1 | 9/2010 | Addiego et al. | |
| 2012/0045657 A1 | 2/2012 | Schulz-Harder et al. | |
| 2012/0141701 A1 * | 6/2012 | Fourcade | C03B 5/1672 428/34.1 |
| 2014/0235427 A1 | 8/2014 | Citti et al. | |

FOREIGN PATENT DOCUMENTS

| | | |
|---|---|---|
| JP | S5590472 A | 7/1980 |
| JP | H03215348 A | 9/1991 |
| JP | 2009500286 A | 1/2009 |
| JP | 2010519163 A | 6/2010 |
| JP | 2010526752 A | 8/2010 |
| JP | 2011502918 A | 1/2011 |
| TW | 201223912 A1 | 6/2012 |
| WO | 2012075470 A2 | 6/2012 |
| WO | 2014127369 A1 | 8/2014 |

OTHER PUBLICATIONS

Goerenz, Edmund, "4.1.3. Zirkonhaltige Steine," In: Gerald Routschka/Hartmut Wuthnow: "Praxishandbuch Feuerfeste Werkstoffe; 5. Auflage," dated Oct. 14, 2011, pp. 53-55.

Kaiser, A. et al., "Thermal Stability of Zircon (ZrSiO4)", Journal of the European Ceramic Society, Elsevier Science Publishers, Barking, Essex, GB, vol. 28, No. 11, dated Apr. 23, 2008, pp. 2199-2211.

Extended European Search Report for EP Application No. 14751811.2, dated Jul. 15, 2016, 11 pages.

* cited by examiner

US 9,624,132 B2

SINTERED ZIRCON MATERIAL FOR FORMING BLOCK

CROSS-REFERENCE TO RELATED APPLICATION(S)

The present application is a continuation of and claims priority from U.S. patent application Ser. No. 14/183,226 filed Feb. 18, 2014, entitled "Sintered Zircon Material for Forming Block," and naming Olivier Citti, Julien P. Fourcade, Andrea L. Kazmierczak and David J. Lechevalier as inventors, which in turn claims priority from U.S. Provisional Patent Application No. 61/766,090 entitled "Sintered Zircon Material for Forming Block," by Olivier Citti, Julien P. Fourcade, Andrea L. Kazmierczak and David J. Lechevalier, filed Feb. 18, 2013, which both applications are incorporated by reference herein in their entireties.

FIELD OF THE DISCLOSURE

The present disclosure is generally directed to zircon components and methods of forming and using zircon components.

BACKGROUND

Alkali free alumino-silicate glasses, such as, glasses for Liquid Crystal Display (LCD) substrates using amorphous silicon or oxide thin film transistors (TFTs), or glasses for organic light emitting diode (OLED) substrates using low temperature polysilicon (LTPS) TFT deposition have been designed to allow high temperature processing (up to 700° C.) while not suffering from deformation. These glasses can be formed using a fusion draw process where liquid glass flows over the lips of a glass overflow forming block made of zircon ($ZrSiO_4$) material and fuses at the bottom of the glass overflow forming block to form a sheet. Zircon forming blocks that come in contact with alkali free alumino-boro-silicate glasses offer good corrosion resistance and mechanical properties at the forming temperature of glass. However, it has been observed that bubble inclusions may occur in the glass formed using zircon forming blocks. Bubble inclusions in the glass are not acceptable for the TFT substrate application.

SUMMARY

According to one aspect, a component includes a body including zircon ($ZrSiO_4$) grains, the body having an outer portion and an interior portion. The body may have a free silica intergranular phase present between the zircon grains. The free silica intergranular phase may be distributed substantially uniformly through the body. Free silica may include any silicon dioxide ($SiO_2$) that is not chemically bound to the $ZrSiO_4$ grains in the body. The body may comprise a content of free silica not greater than about 2 wt. % for the total weight of the body.

According to another aspect, a component includes a body including zircon grains, the body having an outer portion and an interior portion. The body may have a free silica intergranular phase present between the zircon grains. Free silica may include any silicon dioxide ($SiO_2$) that is not chemically bound to the $ZrSiO_4$ grains in the body. The body may comprise a content of free silica not greater than about 2 wt. % for the total weight of the body. Further, the outer portion of the body may have an apparent porosity measured in volume percent ($P_{op}$) and the interior portion of the body may have an apparent porosity measured in volume percent ($P_{ip}$). The body may have an apparent porosity ratio $P_{op}/P_{ip}$ of not greater than about 2.0.

According to yet another aspect, a component includes a body including zircon grains, the body having an outer portion and an interior portion. The body may have a free silica intergranular phase present between the zircon grains. Free silica may include any silicon dioxide ($SiO_2$) that is not chemically bound to the $ZrSiO_4$ grains in the body. The body may comprise a content of free silica not greater than about 2 wt. % for the total weight of the body. Further, the body may have at least one characteristic selected from the group consisting of 1) a fracture toughness (K1c) of greater than about 1.55 $MPa \cdot m^{-0.5}$, 2) a modulus of rupture (MoR) of greater than about 60 MPa, 3) a density of greater than about 4.0 $g/cm^3$, 4) a modulus of elasticity (MoE) of greater than about 175 GPa, 5) a Vickers hardness of greater than about 6.0 GPA, and 6) any combination thereof.

According to another aspect, a component includes a body including zircon grains, the body having an outer portion and an interior portion. The body may have a free silica intergranular phase present between the zircon grains. Free silica may include any silicon dioxide ($SiO_2$) that is not chemically bound to the $ZrSiO_4$ grains in the body. The body may comprise a content of free silica not greater than about 2 wt. % for the total weight of the body. Further, a surface of the body may have a dynamic corrosion rate of not greater than about 100 μm/day.

According to yet another aspect, a component includes a body including zircon grains, the body having an outer portion and an interior portion. The body may have a free silica intergranular phase present between the zircon grains. Free silica may include any silicon dioxide ($SiO_2$) that is not chemically bound to the $ZrSiO_4$ grains in the body. The body may comprise a content of free silica not greater than about 2 wt. % for the total weight of the body. Further, the interconnectivity of the free silica intergranular phase in the outer portion of the body may be greater than about 10%.

In another aspect, a method of forming a component may include providing a raw material powder comprising zircon grains having a median (D50) particle size in a range between about 1 μm and about 20 μm. The raw material powder may have a content of free silica of not greater than about 2.0 wt. % for a total weight of raw material powder. The raw material powder may be sintered to create a body comprising zircon grains and a free silica intergranular phase present between the zircon grains with the free silica intergranular phase being distributed substantially uniformly through the body. Free silica may include any silicon dioxide ($SiO_2$) that is not chemically bound to the $ZrSiO_4$ grains in the body.

BRIEF DESCRIPTION OF THE DRAWINGS

The present disclosure may be better understood, and its numerous features and advantages made apparent to those skilled in the art by referencing the accompanying drawings. Embodiments are illustrated by way of example and are not limited in the accompanying figures.

Figure 1:
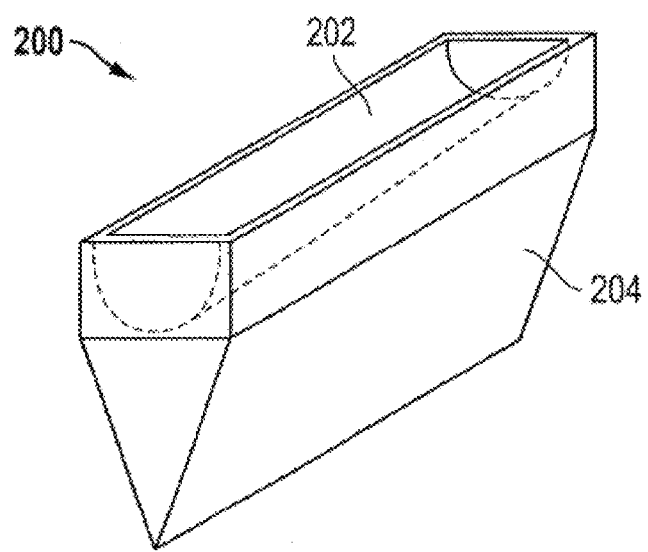
FIG. 1 includes a diagram illustrating a particular embodiment of a glass overflow forming block.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DESCRIPTION

The following is generally directed to a component having a body that includes zircon material and methods of forming a component having a body that includes zircon material, wherein the zircon material has a free silica content of not greater than about 2 wt. %, preferably not greater than about 1 wt. % and most preferably not greater than about 0.5 wt. % for the total weight of the body. Notably, any reference to free silica in this description corresponds to all $SiO_2$ phases in the body that are not chemically bonded to $ZrO_2$ in the zircon material.

In certain embodiments, the body may include a free silica intergranular phase present between the zircon grains of the zircon material. The free silica intergranular phase may be distributed substantially uniformly though the body. The body may comprise a content of free silica not greater than about 2 wt. % for the total weight of the body. The free silica intergranular phase may consist essentially of free silica and essentially all $SiO_2$ located in the grain boundary of the zircon grains may be considered free silica.

The raw material powder used in forming the body may initially comprise an unprocessed raw material, for example, unprocessed zircon raw material. The unprocessed raw material may be initially processed by separating components (e.g., impurities) from the unprocessed raw material. The unprocessed raw material may be processed using classifying techniques, for example, particle size separation, vibration or gravity table separation, electrostatic separation, electromagnetic separation or any combination thereof. Particle size separation allows for separation of particles within a powder based on its size, which reduces impurity content. Vibration or gravity table separation can separate particles within a powder based on density, which can reduce the amount of alumina rich silicates as well as silica grains from the raw material powder. Electrostatic separation can separate particles within a powder based on electrical conductivity, which may allow the separation of titaniferous mineral particles, ilmenite and rutile. Electromagnetic separation can separate particles within a powder based on the magnetic properties of the particles. It will be appreciated that initial processing of the unprocessed raw material may include any combination of the separation methods noted above and may include multiple applications of any of the separation methods noted above. It will be further appreciated that initial processing of the unprocessed raw material may include application of the separation methods above in sequence or in parallel.

The unprocessed raw material and any additional materials can be milled to create the raw material powder having a particular particle size and particle distribution that may facilitate formation of a component according to an embodiment. Milling the unprocessed raw material to form the raw material powder can be done using different milling technologies, for example, dry ball milling, wet ball milling, vibratory ball milling, attrition milling (agitated ball milling) or jet milling.

After initial processing and milling, the raw material powder formed from the unprocessed raw material may have a median (D50) particle size of not greater than about 15 μm, such as, not greater than about 14 μm, not greater than about 12 μm, not greater than about 10 μm, not greater than about 9 μm, not greater than about 8 μm, not greater than about 7 μm, not greater than about 6 μm, not greater than about 5 μm, not greater than about 4 μm, not greater than about 3 μm or even not greater than about 2 μm. Further the raw material powder may have a median(D50) particle size of greater than about 1 μm, such as, greater than about 2 μm, greater than about 3 μm, greater than about 4 μm, greater than about 5 μm, greater than about 6 μm, greater than about 7 μm, greater than about 8 μm, greater than about 9 μm, greater than about 10 μm, greater than about 12 μm or even greater than about 14 μm. It will be appreciated that raw material powder may have a median (D50) particle size of any value within a range between any of the maximum and minimum values noted above. It will be further appreciated that raw material powder may have a median (D50) particle size of any value within a range between any numerical values between the maximum and minimum values noted above.

In other embodiments, particle size distribution of the raw material powder comprising zircon may be controlled such that the raw material powder may have a D90 particle size of not greater than about 40 μm, such as, not greater than about 30 μm, not greater than about 20 μm, not greater than about 15 μm or even not greater than about 10 μm. In still other instances, the raw material powder may have a D90 particle size of greater than about 5 μm, such as, greater than about 10 μm, greater than about 15 μm, greater than about 20 μm or even greater than about 30 μm. It will be appreciated that the raw material powder may have a D90 particle size of any value within a range between any of the maximum and minimum values noted above. It will be further appreciated that the raw material powder may have a D90 particle size of any value within a range between any numerical values between the maximum and minimum values noted above.

In other embodiments, particle size distribution of the raw material powder comprising zircon may be controlled such that the raw material powder may have a D10 particle size of greater than about 0.2 μm, such as, greater than about 0.5 μm, greater than about 0.8 μm or even greater than about 1.0 μm. In still other instances, the raw material powder may have a D10 particle size of not greater than about 1.1 μm, such as, not greater than about 1.0 μm, not greater than about 0.8 μm or even not greater than about 0.5 μm. It will be appreciated that the raw material powder may have a D10 particle size of any value within a range between any of the maximum and minimum values noted above. It will be further appreciated that the raw material powder may have a D10 particle size of any value within a range between any numerical values between the maximum and minimum values noted above.

The raw material powder and any additional materials (i.e., sintering aids, binders, other additives, etc.) may be combined or mixed by any suitable method. Mixing or batch preparation may be performed dry or wet. Mixing may include an addition step of granulation. The granulation step may be added to improve flowability of the batch and therefore increase apparent density of the green body. In one example embodiment, granulation may be performed using spray drying. The raw material powders may be mixed into a blunge tank and then spray dried.

The spray dried powder or batch is then shaped to form a green body having a particular shape using isostatic pressing. The spray dried powder forms a highly flowable powder that can be used to fill large isostatic molding cans to minimize filling defects, such as, non-uniform compaction of green density, voids or cracks. The raw material powder is filled into a rubber mold maintained in a solid metallic can. The bag is then sealed and a vacuum is applied to the raw material powder. The can is then submerged into a pressure vessel filled with a fluid and then pressed. After pressing the mold is removed from the pressure vessel and the green body is removed.

Shaping may occur at a particular pressure, for example, by isostatic pressing at a pressure greater than about 50 MPa, such as, greater than about 60 MPa, greater than about 70 MPa, greater than about 80 MPa, greater than about 90 MPa, greater than about 100 MPa, greater than about 110 MPa, greater than about 120 MPa, greater than about 130 MPa, greater than about 140 MPa or even greater than about 150 MPa. The pressure may be applied step by step to the green body using an isostatic pressing cycle lasting for about 10 minutes to about 120 minutes. These pressing cycles may limit formation of defects during the pressing stage. Shaping may also be performed using alternative techniques such as slip casting or unidirectional pressing.

The shape of the green body can be rectilinear, cylindrical, spherical, ellipsoidal or nearly any other shape. In a particular embodiment, the green body can be in the shape of a rectilinear block referred to as a blank that can subsequently be machined to form a glass overflow trough, a spout lip or a busing block. In another particular embodiment, the green body may have at least one dimension larger than about 100 mm, such as, larger than about 200 mm, larger than about 300 mm, larger than about 400 mm, larger than about 500 mm, larger than about 600 mm, larger than about 700 mm or even larger than about 800 mm. In another embodiment, the green body can be structured in such a fashion to more closely match a final component, for example, a forming block, to limit post forming processes.

Figure 2:
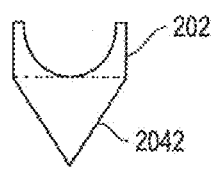
FIG. 2 includes a diagram illustrating a particular set of various cross-sectional perspectives of glass overflow forming blocks.
Figure 2:
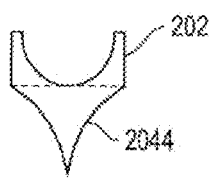
Figure 2:
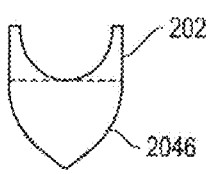

FIG. 1 illustrates a forming block 200. The forming block 200 can include an overflow trough portion 202 and a tapered portion 204. The overflow trough portion 202 can include a trough that has a depth that decreases along a length of the forming block 200. FIG. 2 include a cross-sectional view of exemplary shapes of the tapered portion 204. More particularly, the tapered portion can include a wedge shape 2042, a concave shape 2044, or a convex shape 2046. Other shapes may be used to meet the needs or desires for a particular application.

After the green body is formed, the green body can be heated in an oven, heater, furnace, or the like to form the body that includes zircon material. The heating process can include an initial heating where moisture, a solvent, or another volatile component is evaporated, organic material is vaporized, or any combination thereof. The initial heating can be conducted at a temperature in a range of approximately 100° C. to approximately 300° C. for a time period in a range of approximately 10 hours to approximately 200 hours. In one embodiment, following the initial heating, the green body can be sintered at a temperature of greater than about 1400° C., such as, greater than about 1450° C., greater than about 1500° C., greater than about 1550° C., greater than about 1600° C. or even greater than about 1650° C. In another embodiment, following the initial heating, the green body can be sintered at a temperature of not greater than about 1700° C., such as, not greater than about 1650° C., not greater than about 1600° C., not greater than about 1600° C., not greater than about 1550° C., not greater than about 1500° C. or even not greater than about 1450° C. The green body can be sintered for a time period in a range of approximately 10 hours to approximately 100 hours to form the body.

Sintering can include heating the green body for multiple time periods in a sintering cycle for a set duration. The duration of the sintering cycle may be greater than about 30 days, such as, greater than about 35 days, greater than about 40 days, greater than about 45 days, greater than about 50 days, greater than about 55 days, greater than about 60 days, greater than about 65 days, greater than about 70 days, greater than about 75 days, greater than about 80 days or even greater than about 85 days. Further, the sintering cycle duration may be not greater than about 90 days, such as, not greater than about 85 days, not greater than about 80 days, not greater than about 75 days, not greater than about 70 days, not greater than about 65 days, not greater than about 60 days, not greater than about 55 days, not greater than about 50 days, not greater than about 45 days or even not greater than about 40 days.

The shape of the body after sintering generally corresponds to the shape of the green body prior to sintering. Thus, the body may have any of the shapes as previously described with respect to the green body. During sintering, some shrinkage may occur, and the body may be smaller than the green body.

A sintered object, such as the body, can be distinguished from objects that have been formed by fuse-casting. In particular, objects that have been formed by fuse-casting often include a highly abundant intergranular glass phase that fills the network of crystallized grains of the object. In contrast, a sintered object can include phases that are formed at the grain boundaries with another phase. Due to differences in their microstructures, the problems encountered by sintered objects and by fused-cast objects in their respective applications and the technical solutions adopted for solving them are generally different. Furthermore, due to the differences between manufacturing an object by sintering and manufacturing an object by fuse-casting, a composition developed for a fused-cast product may not be used a priori for manufacturing a sintered product.

Providing the raw material comprising zircon grains may include a providing raw material powder having a content of free silica not greater than about 2.0 wt. % for the total weight of raw material powder. In another aspect of the embodiment, the content of free silica in the raw material powder may be, for example, not greater than about 1.9 wt. %, such as, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. %, not greater than about 1.0 wt. %, not greater than about 0.9 wt. %, not greater than about 0.8 wt. %, not greater than about 0.7 wt. %, not greater than about 0.6 wt. %, not greater than about 0.5 wt. %, not greater than about 0.4 wt. %, not greater than about 0.3 wt. % or even not greater than about 0.2 wt. % for the total weight of raw material powder. In still other instances, the content of free silica in the raw material powder may be greater than about 0.1 wt. %, such as, greater than about 0.2 wt. %, greater than about 0.3 wt. %, greater than about 0.4 wt. %, greater than about 0.5 wt. %, greater than about 0.6 wt. %, greater than about 0.7 wt. %, greater than about 0.8 wt. %, greater than about 0.9 wt. %, greater than about 1.0 wt. %, greater than about 1.1 wt. %, greater than about 1.2 wt. %, greater than about 1.3 wt. %, greater than about 1.4 wt. %, greater than about 1.5 wt. %, greater than about 1.6 wt. %, greater than about 1.7 wt. %, greater than about 1.8 wt. % or even greater about 1.9 wt. % for the total weight of the raw material powder. It will be appreciated that the content of free silica in the raw material in wt. % for the total weight of raw material powder may be any value within a range between any of the maximum and minimum values noted above. It will be further appreciated that the content of free silica in the raw material in wt. % for the total weight of raw material powder may be any value within a range between any numerical values between the maximum and minimum values noted above.

The raw material powder may be comprised mainly of zircon ($ZrSiO_4$), such as, for example, the raw material powder may include a content of $ZrSiO_4$ of greater than about 95 wt. %, such as, greater than about 96 wt. %, greater than about 97 wt. %, greater than about 98 wt. %, greater than about 99 wt. % or even greater about 99.5 wt. % for the total weight of the raw material powder. In still other instances, the raw material powder may include a content of $ZrSiO_4$ of not greater than about 99.9 wt. %, not greater than about 99.5 wt. %, not greater than about 99 wt. %, not greater than about 98 wt. %, not greater than about 97 wt. %, not greater than about 96 wt. % or even not greater than about 95 wt. % for the total weight of the raw material powder. It will be appreciated that the content of $ZrSiO_4$ in the raw material in wt. % for the total weight of raw material powder may be any value within a range between any of the maximum and minimum values noted above. It will be further appreciated that the content of $ZrSiO_4$ in the raw material in wt. % for the total weight of raw material powder may be any value within a range between any numerical values between the maximum and minimum values noted above.

The raw material powder may be substantially free of $Al_2O_3$. The raw material powder may include a content of $Al_2O_3$ of not greater than 0.5 wt. %, such as, not greater than 0.45 wt. %, not greater than 0.4 wt. % wt. %, not greater than 0.35 wt. %, not greater than 0.3 wt. %, not greater than 0.25 wt. %, not greater than 0.2 wt. %, not greater than 0.15 wt. %, not greater than 0.1 wt. % or even not greater than 0.05 wt. % for the total weight of the raw material powder. In still other instances, the raw material powder may include a content of $Al_2O_3$ of greater than about 0.01 wt. %, such as, greater than about 0.05 wt. %, greater than about 0.1 wt. %, greater than about 0.15 wt. %, greater than about 0.2 wt. %, greater than about 0.25 wt. %, greater than about 0.3 wt. %, greater than about 0.35 wt. %, greater than about 0.4 or even greater about 0.45 wt. % for the total weight of the raw material powder. It will be appreciated that the content of $Al_2O_3$ in the raw material in wt. % for the total weight of raw material powder may be any value within a range between any of the maximum and minimum values noted above. It will be further appreciated that the content of $Al_2O_3$ in the raw material in wt. % for the total weight of raw material powder may be any value within a range between any numerical values between the maximum and minimum values noted above.

Notably, the raw material powder may have a particular ratio of the content of $Al_2O_3$ in the raw material powder ($CP_{Al2O3}$) to the content of free silica in the raw material powder ($CP_{FS}$). The ratio may be expressed mathematically as $CP_{Al2O3}/CP_{FS}$. $CP_{Al2O3}$ can represent the content of $Al_2O_3$ in the raw material powder measured as a wt. % of the total weight of the raw material powder. $CP_{FS}$ can represent the content of free silica in the raw material powder measured as a wt. % of the total weight of the raw material powder. The raw material powder may have a ratio $CP_{Al2O3}/CP_{FS}$ of not greater than about 5, such as, not greater than about 3, not greater than about 1, not greater than about 0.5, not greater than about 0.4, not greater than about 0.3, not greater than about 0.2, not greater than about 0.1, not greater than about 0.01 or even not greater than about 0.005. In still other instances, the raw material powder may have a ratio $CP_{Al2O3}/CP_{FS}$ of greater than about 0.0025, such as, greater than about 0.005, greater than about 0.01, greater than about 0.1, greater than about 0.2, greater than about 0.3, greater than about 0.4, greater than about 0.5, greater than about 0.6, greater than about 0.7, greater than about 0.8 or even greater about 0.9. It will be appreciated that the ratio $CP_{Al2O3}/CP_{FS}$ may be any value within a range between any of the maximum and minimum values noted above. It will be further appreciated that the ratio $CP_{Al2O3}/CP_{FS}$ may be any value within a range between any numerical values between the maximum and minimum values noted above.

Alternatively, the raw material powder may have a particular ratio of the content of $Al_2O_3$ in the raw material powder ($CP_{Al2O3}$) to the content of $ZrSiO_4$ in the raw material powder ($CP_{ZrSiO4}$). The ratio may be expressed mathematically as $CP_{Al2O3}/CP_{ZrSiO4}$. $CP_{Al2O3}$ can represent the content of $Al_2O_3$ in the raw material powder measured as a wt. % of the total weight of the raw material powder. $CP_{ZrSiO4}$ can represent the content of $ZrSiO_4$ in the raw material powder measured as a wt. % of the total weight of the raw material powder. The raw material powder may have a ratio $CP_{Al2O3}/CP_{ZrSiO4}$ of not greater than about 0.007, such as, not greater than about 0.006, not greater than about 0.005, not greater than about 0.004, not greater than about 0.003, not greater than about 0.002 or even not greater than about 0.001. In still other instances, the raw material powder may have a ratio $CP_{Al2O3}/CP_{ZrSiO4}$ of greater than about 0.0005, such as, greater than about 0.001, greater than about 0.002, greater than about 0.003, greater than about 0.004, greater than about 0.005 or even greater about 0.006. It will be appreciated that the ratio $CP_{Al2O3}/CP_{ZrSiO4}$ may be any value within a range between any of the maximum and minimum values noted above. It will be further appreciated that the ratio $CP_{Al2O3}/CP_{ZrSiO4}$ may be any value within a range between any numerical values between the maximum and minimum values noted above.

The zircon grains in the raw material powder may include a content of free silica of not greater than about 2.0 wt. %, such as, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. %, not greater than about 1.0 wt. %, not greater than about 0.9 wt. %, not greater than about 0.8 wt. %, not greater than about 0.7 wt. %, not greater than about 0.6 wt. %, not greater than about 0.5 wt. %, not greater than about 0.4 wt. %, not greater than about 0.3 wt. % or even not greater than about 0.2 wt. % for the total weight of the zircon grains in the raw material powder. In still other instances, the zircon grains in the raw material powder may include a content of free silica of greater than about 0.1 wt. %, such as, greater than about 0.2 wt. %, greater than about 0.3 wt. %, greater than about 0.4 wt. %, greater than about 0.5 wt. %, greater than about 0.6 wt. %, greater than about 0.7 wt. %, greater than about 0.8 wt. %, greater than about 0.9 wt. %, greater than about 1.0 wt. %, greater than about 1.1 wt. %, greater than about 1.2 wt. %, greater than about 1.3 wt. %, greater than about 1.4 wt. %, greater than about 1.5 wt. %, greater than about 1.6 wt. %, greater than about 1.7 wt. %, greater than about 1.8 wt. % or even greater about 1.9 wt. % for the total weight of the zircon grains in the raw material powder. It will be appreciated that the content of free silica in the zircon grains in the raw material powder in wt. % for the total weight of the zircon grains in the raw material powder may be any value within a range between any of the maximum and minimum values noted above. It will be further appreciated that the content of free silica in the zircon grains in the raw material powder in wt. % for the total weight of the zircon grains in the raw material powder may be any value within a range between any numerical values between the maximum and minimum values noted above.

The zircon grains in the raw material powder may also be substantially free of $Al_2O_3$. The zircon grains in the raw material powder may include a content of $Al_2O_3$ of not greater than 0.5 wt. %, such as, not greater than about 0.45 wt. %, not greater than about 0.4 wt. %, not greater than about 0.35 wt. %, not greater than about 0.3 wt. %, not greater than about 0.25 wt. %, not greater than about 0.2 wt. %, not greater than about 0.15 wt. %, not greater than about 0.1 wt. %, not greater than about 0.05 wt. % or even not greater than about 0.01 wt. % for the total weight of the zircon grains in the raw material powder. In still other instances, the zircon grains in the raw material powder may include a content of $Al_2O_3$ of greater than about 0.001 wt. %, such as, greater than about 0.01 wt. %, greater than about 0.05 wt. %, greater than about 0.1 wt. %, greater than about 0.15 wt. %, greater than about 0.2 wt. %, greater than about 0.25 wt. %, greater than about 0.3 wt. %, greater than about 0.35 wt. %, greater than about 0.4 wt. % or even greater about 0.45 wt. % for the total weight of the zircon grains in the raw material powder. It will be appreciated that the content of $Al_2O_3$ in the zircon grains in the raw material powder in wt. % for the total weight of the zircon grains in the raw material powder may be any value within a range between any of the maximum and minimum values noted above. It will be further appreciated that the content of $Al_2O_3$ in the zircon grains in the raw material powder in wt. % for the total weight of the zircon grains in the raw material powder may be any value within a range between any numerical values between the maximum and minimum values noted above.

A sintering aid may be combined with the raw material powder to form a combined material mixture prior to shaping the combined material mixture to form a green body. The sintering aid may include an oxide, including, for example, $Ta_2O_5$, $TiO_2$, $Nb_2O_5$, $Fe_2O_3$ or a combination thereof. In specific embodiments, the sintering aid may consist essentially of $Ta_2O_5$. The combined raw material mixture may include a content of sintering aid of greater than about 0.2 wt. %, such as, greater than about 0.3 wt. %, greater than about 0.4 wt. %, greater than about 0.5 wt. %, greater than about 0.6 wt. %, greater than about 0.7 wt. %, greater than about 0.8 wt. %, greater than about 0.9 wt. %, greater than about 1.0 wt. %, greater than about 1.1 wt. %, greater than about 1.2 wt. %, greater than about 1.3 wt. % or even greater about 1.4 wt. % for the total weight of the combined material mixture. In still other instances, the combined raw material mixture may include a content of sintering aid of not greater than about 1.5 wt. %, such as, not greater than about 1.4 wt. %, not greater than about 1.3 wt. %, not greater than about 1.2 wt. %, not greater than about 1.1 wt. %, not greater than about 1.0 wt. %, not greater than about 0.9 wt. %, not greater than about 0.8 wt. %, not greater than about 0.7 wt. %, not greater than about 0.6 wt. %, not greater than about 0.5 wt. %, not greater than about 0.4 wt. % or even not greater than about 0.3 wt. % for the total weight of the combined material mixture. It will be appreciated that the content of sintering aid in wt. % for the total weight of the material mixture may be any value within a range between any of the maximum and minimum values noted above. It will be further appreciated that the content of sintering aid in wt. % for the total weight of the material mixture may be any value within a range between any numerical values between the maximum and minimum values noted above.

Notably, the combined material mixture may have a particular ratio of the content of sintering aid in the combined material mixture ($CP_{SA}$) to the content of free silica in the combined material mixture ($CP_{FS}$). The ratio may be expressed mathematically as $CP_{SA}/CP_{FS}$. $CP_{SA}$ can represent the content of sintering aid in the combined material mixture measured as wt. % of the total weight of the combined material mixture. $CP_{FS}$ can represent the content of free silica in the combined material mixture measured as wt. % of the total weight of the combined material mixture. The combined material mixture may have a ratio $CP_{SA}/CP_{FS}$ of not greater than about 15, such as, not greater than about 10, not greater than about 5, not greater than about 1, not greater than about 0.5, not greater than about 0.4, not greater than about 0.3, not greater than about 0.2, not greater than about 0.1 or even not greater than about 0.05. In still other instances, the combined material mixture may have a ratio $CB_{SA}/CB_{FS}$ of greater than about 0.05, such as, greater than about 0.1, greater than about 0.2, greater than about 0.3, greater than about 0.4, greater than about 0.5, greater than about 1, greater than about 5, greater than about 10 or even greater than about 14. It will be appreciated that the ratio $CP_{SA}/CP_{FS}$ may be any value within a range between any of the maximum and minimum values noted above. It will be further appreciated that the ratio $CP_{SA}/CP_{FS}$ may be any value within a range between any numerical values between the maximum and minimum values noted above.

In other embodiments, the raw material powder may have a content of zirconia ($ZrO_2$) of not greater than about 2 wt. %, such as, not greater than about 1 wt. %, not greater than about 0.5 wt. %, not greater than about 0.3 wt. %, not greater than about 0.2 wt. % or even not greater than about 0.1 wt. % for the total weight of the raw material powder. In other embodiments, the raw material powder may have a have a content of $ZrO_2$ of greater than about 0.05 wt. %, such as, greater than about 0.1 wt. %, greater than about 0.2 wt. %, greater than about 0.5 wt. %, greater than about 0.7 wt. % or even greater than about 1.0 wt. % for the total weight of the raw material powder. It will be appreciated that the content of $ZrO_2$ in wt. % for the total weight of the raw material powder may be any value within a range between any of the maximum and minimum values noted above. It will be further appreciated that the content of $ZrO_2$ in wt. % for the total weight of the raw material powder may be any value within a range between any numerical values between the maximum and minimum values noted above.

In other embodiments, the raw material powder may have a minimal content of metal oxides, such as, for example, rare earth oxides, alkali earth oxides, alkali oxides and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide. Alkali earth oxides may include any oxide compositions that include group two metals (i.e., beryllium, magnesium, calcium, strontium, barium and radium), for example, magnesium oxide, calcium oxide and barium oxide. Alkali oxides may include any oxide compositions that include group one metals, (i.e., lithium, sodium, potassium, rubidium, cesium, and francium), for example, lithium oxide, potassium oxide and cesium oxide. A raw material powder that has a minimal content of any oxide noted above, for example, rare earth oxides, alkali earth oxides, alkali oxides and any transition metal oxide not expressly disclosed herein, may have a content of that oxide of not greater than about 1 wt. %, such as, not greater than about 0.7 wt. %, not greater than about 0.5 wt. % or even not greater than about 0.2 wt. % of the total weight of the raw material powder.

In other embodiments, the raw material powder may have a limited content of certain compounds that would exist in conventional materials formed through conventional techniques. For example, the raw material powder may have a content of $H_2SiF_6$, $K_2SiF_6$ or $(NH_4)_2SiF_6$ of not greater than about 0.5 wt. %, such as, not greater than about 0.4 wt. %, not greater than about 0.3 wt. %, not greater than about 0.2 wt. %, not greater than about 0.1 wt. %, not greater than about 0.01 wt. % or event not greater than about 0.001 wt. % of a total weight of the raw material powder. In still other instances, the raw material powder may have a content of $H_2SiF_6$, $K_2SiF_6$ or $(NH_4)_2SiF_6$ of greater than about 0.0001 wt. %, such as, greater than about 0.001 wt. %, greater than about 0.01 wt. %, greater than about 0.1 wt. %, greater than about 0.2 wt. % or event not greater than about 0.3 wt. % of a total weight of the raw material powder. It will be appreciated that the content of $H_2SiF_6$, $K_2SiF_6$ or $(NH_4)_2SiF_6$ in the raw material powder in wt. % for the total weight of the raw material powder may be any value within a range between any of the maximum and minimum values noted above. It will be further appreciated that the content of $H_2SiF_6$, $K_2SiF_6$ or $(NH_4)_2SiF_6$ in the raw material powder in wt. % for the total weight of the raw material powder may be any value within a range between any numerical values between the maximum and minimum values noted above.

In other embodiments, the raw material powder may have a content of $TiO_2$ of not greater than about 1 wt. %, not greater than about 0.9 wt. %, not greater than about 0.5 wt. %, not greater than about 0.3 wt. %, or even not greater than about 0.2 wt. % for the total weight of the raw material powder. In other embodiments, the raw material powder may have a have a content of $TiO_2$ of greater than about 0.1 wt. %, such as, greater than about 0.2 wt. %, greater than about 0.5 wt. %, greater than about 0.7 wt. % or even greater than about 0.9 wt. % for the total weight of the raw material powder. It will be appreciated that the content of $TiO_2$ in wt. % for the total weight of the raw material powder may be any value within a range between any of the maximum and minimum values noted above. It will be further appreciated that the content of $TiO_2$ in wt. % for the total weight of the raw material powder may be any value within a range between any numerical values between the maximum and minimum values noted above.

In other embodiments, the raw material powder may have a content of $Nb_2O_5$ of not greater than about 1 wt. %, not greater than about 0.5 wt. %, not greater than about 0.3 wt. %, not greater than about 0.25 wt. % or even en not greater than about 0.05 wt. % for the total weight of the raw material powder.

In other embodiments, the raw material powder may have a total content of oxides $Nb_2O_5$ and $Ta_2O_5$ of greater than about 0.2 wt. %, greater than about 0.3 wt. %, greater than about 0.5 wt. % or even greater about 0.8 wt. % for the total weight of the raw material powder. In other embodiments, the raw material powder may have a total content of oxides $Nb_2O_5$ and $Ta_2O_5$ of not greater than about 2 wt. %, such as, not greater than about 1.7 wt. %, not greater than about 1.5 wt. % or even not greater than about 1.0 wt. % for the total weight of the raw material powder.

In other embodiments, the raw material powder may have a content of $P_2O_5$ of not greater than about 1 wt. %, not greater than about 0.9 wt. %, not greater than about 0.5 wt. %, not greater than about 0.3 wt. %, or even not greater than about 0.2 wt. % for the total weight of the raw material powder. In other embodiments, the raw material powder may have a have a content of $P_2O_5$ of greater than about 0.1 wt. %, such as, greater than about 0.2 wt. %, greater than about 0.5 wt. %, greater than about 0.7 wt. % or even greater than about 0.9 wt. % for the total weight of the raw material powder. It will be appreciated that the content of $P_2O_5$ in wt. % for the total weight of the raw material powder may be any value within a range between any of the maximum and minimum values noted above. It will be further appreciated that the content of $P_2O_5$ in wt. % for the total weight of the raw material powder may be any value within a range between any numerical values between the maximum and minimum values noted above.

In other embodiments, the raw material powder may have a content of $V_2O_5$ of not greater than about 1 wt. %, not greater than about 0.9 wt. %, not greater than about 0.5 wt. %, not greater than about 0.3 wt. %, or even not greater than about 0.2 wt. % for the total weight of the raw material powder.

In other embodiments, the raw material powder may have a content of $Fe_2O_3$ of not greater than about 0.2 wt. %, not greater than about 0.1 wt. %, not greater than about 0.05 wt. %, not greater than about 0.01 wt. %, or even not greater than about 0.005 wt. % for the total weight of the raw material powder. In other embodiments, the raw material powder may have a have a content of $Fe_2O_3$ of greater than about 0.0025 wt. %, such as, greater than about 0.005 wt. %, greater than about 0.01 wt. %, greater than about 0.05 wt. % or even greater than about 0.1 wt. % for the total weight of the raw material powder. It will be appreciated that the content of $Fe_2O_3$ in wt. % for the total weight of the raw material powder may be any value within a range between any of the maximum and minimum values noted above. It will be further appreciated that the content of $Fe_2O_3$ in wt. % for the total weight of the raw material powder may be any value within a range between any numerical values between the maximum and minimum values noted above.

In other embodiments, the raw material powder may have a content of MnO of not greater than about 0.2 wt. %, not greater than about 0.1 wt. %, not greater than about 0.05 wt. %, not greater than about 0.01 wt. %, or even not greater than about 0.005 wt. % for the total weight of the raw material powder. In other embodiments, the raw material powder may have a have a content of MnO of greater than about 0.0025 wt. %, such as, greater than about 0.005 wt. %, greater than about 0.01 wt. %, greater than about 0.05 wt. % or even greater than about 0.1 wt. % for the total weight of the raw material powder. It will be appreciated that the content of MnO in wt. % for the total weight of the raw material powder may be any value within a range between any of the maximum and minimum values noted above. It will be further appreciated that the content of MnO in wt. % for the total weight of the raw material powder may be any value within a range between any numerical values between the maximum and minimum values noted above.

A particular embodiment of a component formed as described above may include a body including zircon grains, the body having an outer portion and an interior portion. The body may have a free silica intergranular phase present between the zircon grains and the free silica intergranular phase may be distributed substantially uniformly through the body. The intergranular phase may include free silica, wherein the body comprises a content of free silica not greater than about 2 wt. % for the total weight of the body.

In other embodiments, the body may include a content of free silica not greater than about 1.9 wt. %, such as, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. %, not greater than about 1.0 wt. %, not greater than about 0.9 wt. %, not greater than about 0.8 wt. %, not greater than about 0.7 wt. %, not greater than about 0.6 wt. %, not greater than about 0.5 wt. %, not greater than about 0.4 wt. %, not greater than about 0.3 wt. % or even not greater than about 0.2 wt. % for a total weight of the body. In still other instances, the body may include a content of free silica greater than about 0.1 wt. %, such as, greater than about 0.2 wt. %, greater than about 0.3 wt. %, greater than about 0.4 wt. %, greater than about 0.5 wt. %, greater than about 0.6 wt. %, greater than about 0.7 wt. %, greater than about 0.8 wt. %, greater than about 0.9 wt. %, greater than about 1.0 wt. %, greater than about 1.1 wt. %, greater than about 1.2 wt. %, greater than about 1.3 wt. %, greater than about 1.4 wt. %, greater than about 1.5 wt. %, greater than about 1.6 wt. %, greater than about 1.7 wt. %, greater than about 1.8 wt. % or even greater about 1.9 wt. % for the total weight of the body. It will be appreciated that the content of free silica in the body in wt. % for the total weight of the body may be any value within a range between any of the maximum and minimum values noted above. It will be further appreciated that the content of free silica in the body in wt. % for the total weight of the body may be any value within a range between any numerical values between the maximum and minimum values noted above.

In other embodiments, the body may be comprised mainly of $ZrSiO_4$. The body may include a content of $ZrSiO_4$ of greater than about 95 wt. %, such as, greater than about 96 wt. %, greater than about 97 wt. %, greater than about 98 wt. %, greater than about 99 wt. % or even greater about 99.5 wt. % for the total weight of the body. In still other instances, the body may include a content of $ZrSiO_4$ of not greater than about 99.9 wt. %, such as, not greater than about 99.5 wt. %, not greater than about 99 wt. %, not greater than about 98 wt. %, not greater than about 97 wt. %, not greater than about 96 wt. % or not greater than about 95 wt. % for the total weight of the body. It will be appreciated that the content of $ZrSiO_4$ in the body in wt. % for the total weight of body may be any value within a range between any of the maximum and minimum values noted above. It will be further appreciated that the content of $ZrSiO_4$ in the body in wt. % for the total weight of body may be any value within a range between any numerical values between the maximum and minimum values noted above.

In other embodiments, the body may further include a sintering aid. The sintering aid may be $Ta_2O_5$, $TiO_2$, $Nb_2O_5$, $Fe_2O_3$ or any combination thereof. In specific embodiments, the sintering aid may be essentially all $Ta_2O_5$. The body may include a content of sintering aid of greater than about 0.2 wt. %, such as, greater than about 0.3 wt. %, greater than about 0.4 wt. %, greater than about 0.5 wt. %, greater than about 0.6 wt. %, greater than about 0.7 wt. %, greater than about 0.8 wt. %, greater than about 0.9 wt. %, greater than about 1.0 wt. %, greater than about 1.1 wt. %, greater than about 1.2 wt. %, greater than about 1.3 wt. % or even greater about 1.4 wt. % for the total weight of the body. In still other instances, the body may include a content of sintering aid of not greater than about 1.5 wt. %, such as, not greater than about 1.4 wt. %, not greater than about 1.3 wt. %, not greater than about 1.2 wt. %, not greater than about 1.1 wt. %, not greater than about 1.0 wt. %, not greater than about 0.9 wt. %, not greater than about 0.8 wt. %, not greater than about 0.7 wt. %, not greater than about 0.6 wt. %, not greater than about 0.5 wt. %, not greater than about 0.4 wt. % or even not greater than about 0.3 wt. % for the total weight of the body. It will be appreciated that the content of sintering aid in the body in wt. % for the total weight of body may be any value within a range between any of the maximum and minimum values noted above. It will be further appreciated that the content of sintering aid in the body in wt. % for the total weight of body may be any value within a range between any numerical values between the maximum and minimum values noted above.

Notably, the body may have a particular ratio of the content of sintering aid in the body ($CB_{SA}$) to the content of free silica in the body ($CB_{FS}$). The ratio may be expressed mathematically as $CB_{SA}/CB_{FS}$. $CB_{SA}$ can represent the content of sintering aid in the body measured as wt. % of the total weight of the combined material mixture. $CB_{FS}$ can represent the content of free silica in the body measured as wt. % of the total weight of the body. The body may have a ratio $CB_{SA}/CB_{FS}$ of not greater than about 15, such as, not greater than about 10, not greater than about 5, not greater than about 1, not greater than about 0.5, not greater than about 0.4, not greater than about 0.3, not greater than about 0.2, not greater than about 0.1 or even not greater than about 0.05. In still other instances, the body may have a ratio $CB_{SA}/CB_{FS}$ of greater than about 0.05, such as, greater than about 0.1, greater than about 0.2, greater than about 0.3, greater than about 0.4, greater than about 0.5, greater than about 1, greater than about 5, greater than about 10 or even greater than about 14. It will be appreciated that the ratio $CB_{SA}/CB_{FS}$ may be any value within a range between any of the maximum and minimum values noted above. It will be further appreciated that the ratio $CB_{SA}/CB_{FS}$ may be any value within a range between any numerical values between the maximum and minimum values noted above.

The body may be substantially free of $Al_2O_3$. The body may include a content of $Al_2O_3$ of not greater than 0.5 wt. %, such as, not greater than 0.45 wt. %, not greater than 0.4 wt. % wt. %, not greater than 0.35 wt. %, not greater than 0.3 wt. %, not greater than 0.25 wt. %, not greater than 0.2 wt. %, not greater than 0.15 wt. %, not greater than 0.1 wt. % or even not greater than 0.05 wt. % for the total weight of the body. In still other instances, the body may include a content of $Al_2O_3$ of greater than about 0.01 wt. %, such as, greater than about 0.05 wt. %, greater than about 0.1 wt. %, greater than about 0.15 wt. %, greater than about 0.2 wt. %, greater than about 0.25 wt. %, greater than about 0.3 wt. %, greater than about 0.35 wt. %, greater than about 0.4 wt. % or even greater about 0.45 wt. % for the total weight of the body. It will be appreciated that the content of $Al_2O_3$ in the body in wt. % for the total weight of body may be any value within a range between any of the maximum and minimum values noted above. It will be further appreciated that the content of $Al_2O_3$ in the body in wt. % for the total weight of body may be any value within a range between any numerical values between the maximum and minimum values noted above.

Notably, the body may have a particular ratio of the content of $Al_2O_3$ in the body ($CB_{Al2O3}$) to the content of free silica in the body ($CB_{FS}$). The ratio may be expressed mathematically as $CB_{Al2O3}/CB_{FS}$. $CB_{Al2O3}$ can represent the content of $Al_2O_3$ in the body measured as a wt. % of the total weight of the body. $CB_{FS}$ can represent the content of free silica in the body measured as a wt. % of the total weight of the body. The body may have a ratio $CB_{Al2O3}/CB_{FS}$ of not greater than about 5, such as, not greater than about 3, not greater than about 1, not greater than about 0.5, not greater than about 0.4, not greater than about 0.3, not greater than about 0.2, not greater than about 0.1, not greater than about 0.01 or even not greater than about 0.005. In still other instances, the body may have a ratio $CB_{Al2O3}/CB_{FS}$ of greater than about 0.0025, such as, greater than about 0.005, greater than about 0.01, greater than about 0.1, greater than about 0.2, greater than about 0.3, greater than about 0.4, greater than about 0.5, greater than about 0.6, greater than about 0.7, greater than about 0.8 or even greater about 0.9. It will be appreciated that the ratio $CB_{Al2O3}/CB_{FS}$ may be any value within a range between any of the maximum and minimum values noted above. It will be further appreciated that the ratio $CB_{Al2O3}/CB_{FS}$ may be any value within a range between any numerical values between the maximum and minimum values noted above.

Alternatively, the body may have a particular ratio of the content of $Al_2O_3$ in the body ($CB_{Al2O3}$) to the content of $ZrSiO_4$ in the body ($CB_{ZrSiO4}$). The ratio may be expressed mathematically as $CB_{Al2O3}/CB_{ZrSiO4}$. $CB_{Al2O3}$ can represent the content of $Al_2O_3$ in the body measured as a wt. % of the total weight of the body. $CB_{ZrSiO4}$ can represent the content of $ZrSiO_4$ in the body measured as a wt. % of the total weight of the body. The body may have a ratio $CB_{Al2O3}/CB_{ZrSiO4}$ of not greater than about 0.007, such as, not greater than about 0.006, not greater than about 0.005, not greater than about 0.004, not greater than about 0.003, not greater than about 0.002 or even not greater than about 0.001. In still other instances, the raw material powder may have a ratio $CB_{Al2O3}/CB_{ZrSiO4}$ of greater than about 0.0005, such as, greater than about 0.001, greater than about 0.002, greater than about 0.003, greater than about 0.004, greater than about 0.005 or even greater about 0.006. It will be appreciated that the ratio $CB_{Al2O3}/CB_{ZrSiO4}$ may be any value within a range between any of the maximum and minimum values noted above. It will be further appreciated that the ratio $CB_{Al2O3}/CB_{ZrSiO4}$ may be any value within a range between any numerical values between the maximum and minimum values noted above.

The zircon grains in the body may include a content of free silica of not greater than about 2.0 wt. %, such as, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. %, not greater than about 1.0 wt. %, not greater than about 0.9 wt. %, not greater than about 0.8 wt. %, not greater than about 0.7 wt. %, not greater than about 0.6 wt. %, not greater than about 0.5 wt. %, not greater than about 0.4 wt. %, not greater than about 0.3 wt. % or even not greater than about 0.2 wt. % for the total weight of the zircon grains in the body. In still other instances, the zircon grains in the body may include a content of free silica of greater than about 0.1 wt. %, such as, greater than about 0.2 wt. %, greater than about 0.3 wt. %, greater than about 0.4 wt. %, greater than about 0.5 wt. %, greater than about 0.6 wt. %, greater than about 0.7 wt. %, greater than about 0.8 wt. %, greater than about 0.9 wt. %, greater than about 1.0 wt. %, greater than about 1.1 wt. %, greater than about 1.2 wt. %, greater than about 1.3 wt. %, greater than about 1.4 wt. %, greater than about 1.5 wt. %, greater than about 1.6 wt. %, greater than about 1.7 wt. %, greater than about 1.8 wt. % or even greater about 1.9 wt. % for the total weight of the zircon grains in the body. It will be appreciated that the content of free silica in the zircon grains in the body in wt. % for the total weight of the zircon grains in the body may be any value within a range between any of the maximum and minimum values noted above. It will be further appreciated that the content of free silica in the zircon grains in the body in wt. % for the total weight of the zircon grains in the body may be any value within a range between any numerical values between the maximum and minimum values noted above.

The zircon grains in the body may also be substantially free of $Al_2O_3$. The zircon grains in the body may include a content of $Al_2O_3$ of not greater than 0.5 wt. %, such as, not greater than about 0.45 wt. %, not greater than about 0.4 wt. %, not greater than about 0.35 wt. %, not greater than about 0.3 wt. %, not greater than about 0.25 wt. %, not greater than about 0.2 wt. %, not greater than about 0.15 wt. %, not greater than about 0.1 wt. %, not greater than about 0.05 wt. % or even not greater than about 0.01 wt. % for the total weight of the zircon grains in the body. In still other instances, the zircon grains in the body may include a content of $Al_2O_3$ of greater than about 0.001 wt. %, such as, greater than about 0.01 wt. %, greater than about 0.05 wt. %, greater than about 0.1 wt. %, greater than about 0.15 wt. %, greater than about 0.2 wt. %, greater than about 0.25 wt. %, greater than about 0.3 wt. %, greater than about 0.35 wt. %, greater than about 0.4 wt. % or even greater about 0.45 wt. % for the total weight of the zircon grains in the body. It will be appreciated that the content of $Al_2O_3$ in the zircon grains in the body in wt. % for the total weight of the zircon grains in the body may be any value within a range between any of the maximum and minimum values noted above. It will be further appreciated that the content of $Al_2O_3$ in the zircon grains in the body in wt. % for the total weight of the zircon grains in the body may be any value within a range between any numerical values between the maximum and minimum values noted above.

In other embodiments, the body may have a content of zirconia ($ZrO_2$) of not greater than about 2 wt. %, such as, not greater than about 1 wt. %, not greater than about 0.5 wt. %, not greater than about 0.3 wt. %, not greater than about 0.2 wt. % or even not greater than about 0.1 wt. % for the total weight of the body. In other embodiments, the body may have a have a content of $ZrO_2$ of greater than about 0.05 wt. %, such as, greater than about 0.1 wt. %, greater than about 0.2 wt. %, greater than about 0.5 wt. %, greater than about 0.7 wt. % or even greater than about 1.0 wt. % for the total weight of the body. It will be appreciated that the content of $ZrO_2$ in wt. % for the total weight of the body may be any value within a range between any of the maximum and minimum values noted above. It will be further appreciated that the content of $ZrO_2$ in wt. % for the total weight of the body may be any value within a range between any numerical values between the maximum and minimum values noted above.

In other embodiments, the body may have a minimal content of metal oxides, such as, for example, rare earth oxides, alkali earth oxides, alkali oxides and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide. Alkali earth oxides may include any oxide compositions that include group two metals (i.e., beryllium, magnesium, calcium, strontium, barium and radium), for example, magnesium oxide, calcium oxide and barium oxide. Alkali oxides may include any oxide compositions that include group one metals, (i.e., lithium, sodium, potassium, rubidium, cesium, and francium), for example, lithium oxide, potassium oxide and cesium oxide. A body that has a minimal content of any oxide noted above, for example, rare earth oxides, alkali earth oxides, alkali oxides and any transition metal oxide not expressly disclosed herein, may have a content of that oxide of not greater than about 1 wt. %, such as, not greater than about 0.7 wt. %, not greater than about 0.5 wt. % or even not greater than about 0.2 wt. % of the total weight of the body.

In other embodiments, the body may have a limited content of certain compounds that would exist in conventional materials formed through conventional techniques. For example, the body may have a content of $H_2SiF_6$, $K_2SiF_6$ or $(NH_4)_2SiF_6$ of not greater than about 0.5 wt. %, such as, not greater than about 0.4 wt. %, not greater than about 0.3 wt. %, not greater than about 0.2 wt. %, not greater than about 0.1 wt. %, not greater than about 0.01 wt. % or event not greater than about 0.001 wt. % of a total weight of the body. In still other instances, the body may have a content of $H_2SiF_6$, $K_2SiF_6$ or $(NH_4)_2SiF_6$ of greater than about 0.0001 wt. %, such as, greater than about 0.001 wt. %, greater than about 0.01 wt. %, greater than about 0.1 wt. %, greater than about 0.2 wt. % or event not greater than about 0.3 wt. % of a total weight of the body. It will be appreciated that the content of $H_2SiF_6$, $K_2SiF_6$ or $(NH_4)_2SiF_6$ in the body in wt. % for the total weight of the body may be any value within a range between any of the maximum and minimum values noted above. It will be further appreciated that the content of $H_2SiF_6$, $K_2SiF_6$ or $(NH_4)_2SiF_6$ in the body in wt. % for the total weight of the body may be any value within a range between any numerical values between the maximum and minimum values noted above.

In other embodiments, the body may have a content of $TiO_2$ of not greater than about 1 wt. %, not greater than about 0.9 wt. %, not greater than about 0.5 wt. %, not greater than about 0.3 wt. %, or even not greater than about 0.2 wt. % for the total weight of the body. In other embodiments, the body may have a have a content of $TiO_2$ of greater than about 0.1 wt. %, such as, greater than about 0.2 wt. %, greater than about 0.5 wt. %, greater than about 0.7 wt. % or even greater than about 0.9 wt. % for the total weight of the body. It will be appreciated that the content of $TiO_2$ in wt. % for the total weight of the body may be any value within a range between any of the maximum and minimum values noted above. It will be further appreciated that the content of $TiO_2$ in wt. % for the total weight of the body may be any value within a range between any numerical values between the maximum and minimum values noted above.

In other embodiments, the body may have a content of $Nb_2O_5$ of not greater than about 1 wt. %, not greater than about 0.5 wt. %, not greater than about 0.3 wt. %, not greater than about 0.25 wt. % or even en not greater than about 0.05 wt. % for the total weight of the body.

In other embodiments, the body may have a total content of oxides $Nb_2O_5$ and $Ta_2O_5$ of greater than about 0.2 wt. %, greater than about 0.3 wt. %, greater than about 0.5 wt. % or even greater about 0.8 wt. % for the total weight of the body. In other embodiments, the body may have a total content of oxides $Nb_2O_5$ and $Ta_2O_5$ of not greater than about 2 wt. %, such as, not greater than about 1.7 wt. %, not greater than about 1.5 wt. % or even not greater than about 1.0 wt. % for the total weight of the body.

In other embodiments, the body may have a content of $P_2O_5$ of not greater than about 1 wt. %, not greater than about 0.9 wt. %, not greater than about 0.5 wt. %, not greater than about 0.3 wt. %, or even not greater than about 0.2 wt. % for the total weight of the body. In other embodiments, the body may have a have a content of $P_2O_5$ of greater than about 0.1 wt. %, such as, greater than about 0.2 wt. %, greater than about 0.5 wt. %, greater than about 0.7 wt. % or even greater than about 0.9 wt. % for the total weight of the body. It will be appreciated that the content of $P_2O_5$ in wt. % for the total weight of the body may be any value within a range between any of the maximum and minimum values noted above. It will be further appreciated that the content of $P_2O_5$ in wt. % for the total weight of the body may be any value within a range between any numerical values between the maximum and minimum values noted above.

In other embodiments, the body may have a content of $V_2O_5$ of not greater than about 1 wt. %, not greater than about 0.9 wt. %, not greater than about 0.5 wt. %, not greater than about 0.3 wt. %, or even not greater than about 0.2 wt. % for the total weight of the body.

In other embodiments, the body may have a content of $Fe_2O_3$ of not greater than about 0.2 wt. %, not greater than about 0.1 wt. %, not greater than about 0.05 wt. %, not greater than about 0.01 wt. %, or even not greater than about 0.005 wt. % for the total weight of the body. In other embodiments, the body may have a have a content of $Fe_2O_3$ of greater than about 0.0025 wt. %, such as, greater than about 0.005 wt. %, greater than about 0.01 wt. %, greater than about 0.05 wt. % or even greater than about 0.1 wt. % for the total weight of the body. It will be appreciated that the content of $Fe_2O_3$ in wt. % for the total weight of the body may be any value within a range between any of the maximum and minimum values noted above. It will be further appreciated that the content of $Fe_2O_3$ in wt. % for the total weight of the body may be any value within a range between any numerical values between the maximum and minimum values noted above.

In other embodiments, the body may have a content of MnO of not greater than about 0.2 wt. %, not greater than about 0.1 wt. %, not greater than about 0.05 wt. %, not greater than about 0.01 wt. %, or even not greater than about 0.005 wt. % for the total weight of the body. In other embodiments, the body may have a have a content of MnO of greater than about 0.0025 wt. %, such as, greater than about 0.005 wt. %, greater than about 0.01 wt. %, greater than about 0.05 wt. % or even greater than about 0.1 wt. % for the total weight of the body. It will be appreciated that the content of MnO in wt. % for the total weight of the body may be any value within a range between any of the maximum and minimum values noted above. It will be further appreciated that the content of MnO in wt. % for the total weight of the body may be any value within a range between any numerical values between the maximum and minimum values noted above.

In other embodiments, the zircon grains in the body may have a median grain size (D50) of not greater than about 15 µm, such as, not greater than about 14 µm, not greater than about 12 µm, not greater than about 10 µm, not greater than about 9 µm, not greater than about 8 µm, not greater than about 7 µm, not greater than about 6 µm, not greater than about 5 µm, not greater than about 4 µm, not greater than about 3 µm or even not greater than about 2 µm. Further the zircon grains in the body may have a median grain size (D50) of greater than about 1 µm, such as, greater than about 2 µm, greater than about 3 µm, greater than about 4 µm, greater than about 5 µm, greater than about 6 µm, greater than about 7 µm, greater than about 8 µm, greater than about 9 µm, greater than about 10 µm, greater than about 12 µm or even greater than about 14 µm. It will be appreciated that zircon grains in the body may have a median grain size (D50) of any value within a range between any of the maximum and minimum values noted above. It will be further appreciated the zircon grains in the body may have a median grain size of any value within a range between any numerical values between the maximum and minimum values noted above.

In other embodiments, grain size distribution of zircon grains in the body may be controlled such that the zircon grains in the body may have a D90 grain size of not greater than about 40 µm, such as, not greater than about 30 µm, not greater than about 20 µm, not greater than about 15 µm or even not greater than about 10 µm. In still other instances, the zircon grains in the body may have a D90 grain size of greater than about 5 µm, such as, greater than about 10 µm, greater than about 15 µm, greater than about 20 µm or even greater than about 30 µm. It will be appreciated that the zircon grains in the body may have a D90 grain size of any value within a range between any of the maximum and minimum values noted above. It will be further appreciated that the zircon grains in the body may have a D90 grain size of any value within a range between any numerical values between the maximum and minimum values noted above. It will be further appreciated the zircon grains in the body may have a D90 grain size of any value within a range between any numerical values between the maximum and minimum values noted above.

In other embodiments, grain size distribution of the zircon grains in the body may be controlled such that the zircon grains in the body may have a D10 grain size of greater than about 0.2 µm, such as, greater than about 0.5 µm, greater than about 0.8 µm or even greater than about 1.0 µm. In still other instances, the zircon grains in the body may have a D10 grain size of not greater than about 1.1 µm, such as, not greater than about 1.0 µm, not greater than about 0.8 µm or even not greater than about 0.5 µm. It will be appreciated that the zircon grains in the body may have a D10 grain size of any value within a range between any of the maximum and minimum values noted above. It will be further appreciated that the zircon grains in the body may have a D10 grain size of any value within a range between any numerical values between the maximum and minimum values noted above.

Another particular embodiment of a component formed as described above may include a body including zircon grains, the body having an outer portion and an interior portion. The intersection of the outer portion and the inner portion may be measured at a depth of 5000 µm from an outer surface of the body. The body may have a free silica intergranular phase present between the zircon grains. The free silica intergranular phase may include free silica, wherein the body comprises a content of free silica not greater than about 2 wt. % for the total weight of the body. Further, the outer portion of the body may have an apparent porosity measured in volume percent ($P_{op}$) and the interior portion of the body may have an apparent porosity measured in volume percent ($P_{ip}$).

Apparent porosity may be measured using ASTM C20. In certain embodiments, $P_{op}$ and $P_{ip}$ may be substantially similar. For example, $P_{op}$ and $P_{ip}$ may have a difference of not greater than about 25%, such as, not greater than about 20%, not greater than about 15%, not greater than about 10%, not greater than about 5%, not greater than about 4%, not greater than about 3% or not greater than about 2% volume. In other embodiments, $P_{op}$ and $P_{ip}$ may have a difference of greater than about 1%, such as, greater than about 2%, greater than about 3%, greater than about 4%, greater than about 5% or greater than about 9% volume. It will be appreciated that the difference in apparent porosity between $P_{op}$ and $P_{ip}$ may be any value within a range between any of the maximum and minimum values noted above. It will be further appreciated that the difference in apparent porosity between $P_{op}$ and $P_{ip}$ may be any value within a range between any numerical values between the maximum and minimum values noted above.

Notably, the body may have a particular ratio of the apparent porosity of the outer portion of the body ($P_{op}$) to apparent porosity of the inner portion of the body ($P_{ip}$). The ratio may be expressed mathematically as $P_{op}/P_{ip}$. $P_{op}$ can represent the apparent porosity of the outer portion of the body measured in volume percent. $P_{ip}$ can represent the apparent porosity of the interior portion of the body measured in volume percent. In certain embodiments, the body may include an apparent porosity ratio $P_{op}/P_{ip}$ of not greater than about 1.9, such as, not greater than about 1.8, not greater than about 1.7, not greater than about 1.6, not greater than about 1.5, not greater than about 1.4, not greater than about 1.3, not greater than about 1.2 or even not greater than about 1.1. In other embodiments, the body may include an apparent porosity ratio $P_{op}/P_{ip}$ of about 1. In still other embodiments, the body may include an apparent porosity ratio $P_{op}/P_{ip}$ of greater than about 0.8, such as, greater than about 0.85, greater than about 0.9 or even greater than about 0.95. It will be appreciated that the porosity ratio $P_{op}/P_{ip}$ may be any value within a range between any of the maximum and minimum values noted above. It will be further appreciated that the porosity ratio $P_{op}/P_{ip}$ may be any value within a range between any numerical values between the maximum and minimum values noted above.

Another particular embodiment of a component formed as described herein may include a body having a particular content of open porosity (OP). Open porosity may be defined as any porosity open and continuously assessable from the surface of the body of the component. Open porosity may be measured using ASTM D4404. In certain embodiments, the body may include an open porosity of not greater than about 10 vol. % for a total volume of the body, such as, not greater than about 9 vol. %, not greater than about 8 vol. %, not greater than about 7 vol. %, not greater than about 6 vol. %, not greater than about 5 vol. %, not greater than about 4 vol. %, not greater than about 3 vol. %, not greater than about 2 vol. %, not greater than about 1 vol. %, not greater than about 0.5 vol. % or even not greater than about 0.1 vol. %. According to another embodiment, the body may include an open porosity of at least about 0.001 vol. % for a total volume of the body, such as, at least about 0.01 vol. %, at least about 0.1 vol. %, at least about 0.5 vol. %, at least about 1 vol. %, at least about 2 vol. %, at least about 3 vol. %, at least about 4 vol %, at least about 5 vol. %, at least about 6 vol. %, at least about 7 vol %, or ever at least about 8 vol % for the total volume of the body. It will be appreciated that the body may include a content of open porosity of any value within a range between any of the maximum and minimum values noted above. It will be further appreciated that the body may include an open porosity within a range between any numerical values between the maximum and minimum values noted above.

Another particular embodiment of a component formed as described above may include a body including zircon grains, the body having an outer portion and an interior portion. The body may have a free silica intergranular phase present between the zircon grains. The free silica intergranular phase may include free silica, wherein the body comprises a content of free silica not greater than about 2 wt. % for the total weight of the body. Further, the body may have at least one characteristic selected from the group consisting of 1) a fracture toughness (K1c) of greater than about 1.55 MPa·m$^{-0.5}$, 2) a modulus of rupture (MoR) of greater than about 60 MPa, 3) a density of greater than about 4.0 g/cm$^3$, 4) a modulus of elasticity (MoE) of greater than about 175 GPa, 5) a Vickers hardness of greater than about 6.0 GPA, and 6) any combination thereof.

K1c may be determined by indentation according to ASTM E384-89. In other embodiments, the body may have a K1c of greater than about 1.6 MPa·m$^{-0.5}$, such as, greater than about 1.7 MPa·m$^{-0.5}$, greater than about 1.8 MPa·m$^{-0.5}$, greater than about 1.9 MPa·m$^{-0.5}$, greater than about 2.0 MPa·m$^{-0.5}$, greater than about 2.1 MPa·m$^{-0.5}$, greater than about 2.2 MPa·m$^{-0.5}$, greater than about 2.3 MPa·m$^{-0.5}$, greater than about 2.4 MPa·m$^{-0.5}$, greater than about 2.5 MPa·m$^{-0.5}$, greater than about 2.6 MPa·m$^{-0.5}$, greater than about 2.7 MPa·m$^{-0.5}$, greater than about 2.8 MPa·m$^{-0.5}$, greater than about 2.9 MPa·m$^{-0.5}$, greater than about 3.0 MPa·m$^{-0.5}$, greater than about 3.1 MPa·m$^{-0.5}$, greater than about 3.2 MPa·m$^{-0.5}$, greater than about 3.3 MPa·m$^{-0.5}$, greater than about 3.4 MPa·m$^{-0.5}$, greater than about 3.5 MPa·m$^{-0.5}$, greater than about 3.6 MPa·m$^{-0.5}$, greater than about 3.7 MPa·m$^{-0.5}$, greater than about 3.8 MPa·m$^{-0.5}$ or even greater than about 3.9 MPa·m$^{-0.5}$. In still other instances, the body can have a K1c of not greater than about 4.0 MPa·m$^{-0.5}$, such as, not greater than about 3.5 MPa·m$^{-0.5}$, not greater than about 3.4 MPa·m$^{-0.5}$, not greater than about 3.3 MPa·m$^{-0.5}$, not greater than about 3.2 MPa·m$^{-0.5}$, not greater than about 3.1 MPa·m$^{-0.5}$, not greater than about 3.0 MPa·m$^{-0.5}$, not greater than about 2.9 MPa·m$^{-0.5}$, not greater than about 2.8 MPa·m$^{-0.5}$, not greater than about 2.7 MPa·m$^{-0.5}$, not greater than about 2.6 MPa·m$^{-0.5}$, not greater than about 2.5 MPa·m$^{-0.5}$, not greater than about 2.4 MPa·m$^{-0.5}$, not greater than about 2.3 MPa·m$^{-0.5}$, not greater than about 2.2 MPa·m$^{-0.5}$, not greater than about 2.1 MPa·m$^{-0.5}$, not greater than about 2.0 MPa·m$^{-0.5}$, not greater than about 1.9 MPa·m$^{-0.5}$, not greater than about 1.8 MPa·m$^{-0.5}$, not greater than about 1.7 MPa·m$^{-0.5}$, not greater than about 1.6 MPa·m$^{-0.5}$, not greater than about 1.5 MPa·m$^{-0.5}$, not greater than about 1.4 MPa·m$^{-0.5}$ or even not greater than about 1.3 MPa·m$^{-0.5}$. It will be appreciated that the K1c may be any value within a range between any of the maximum and minimum values noted above. It will be further appreciated that the K1c may be any value within a range between any numerical values between the maximum and minimum values noted above.

MoR may be determined using a 4-point bending flexure test at room temperature according to ASTM C133. In one embodiment, the body may have a MoR of greater than about 70 MPa, such as, greater than about 80 MPa, greater than about 90 MPa, greater than about 100, MPa, greater than about 110 MPa, greater than about 120, MPa, greater than about 130 MPa, greater than about 140 MPa, greater than about 150 MPa, greater than about 160 MPa, greater than about 170, MPa, greater than about 180 MPa, greater than about 190 MPa, greater than about 200 MPa or even greater about 210 MPa. In still other instances, the body may have a MoR of not greater than about 220 MPa, such as, not greater than about 210 MPa, not greater than about 200 MPa, not greater than about 190 MPa, not greater than about 180 MPa, not greater than about 170 MPa, not greater than about 160 MPa, not greater than about 150 MPa, not greater than about 140 MPa, not greater than about 130 MPa, not greater than about 120 MPa, not greater than about 110 MPa, not greater than about 100 MPa, not greater than about 90 MPa, not greater than about 80 MPa or even not greater than about 70 MPa. It will be appreciated that the MoR may be any value within a range between any of the maximum and minimum values noted above. It will be further appreciated that the MoR may be any value within a range between any numerical values between the maximum and minimum values noted above.

Density (D) may be determined using apparent specific gravity according to ASTM C20. In one embodiment, the body of the component may have a density of greater than about 4.0 g/cm$^3$, such as, greater than about 4.1 g/cm$^3$, greater than about greater than about 4.2 g/cm$^3$, greater than about 4.3 g/cm$^3$ or even greater about 4.4 g/cm$^3$. In still other instances, the body of the component may have a density of not greater than about not greater than about 4.5 g/cm$^3$, such as, not greater than about 4.4 g/cm$^3$, not greater than about 4.3 g/cm$^3$, not greater than about 4.2 g/cm$^3$ or not greater than about 4.1 g/cm$^3$. It will be appreciated that the density may be any value within a range between any of the maximum and minimum values noted above. It will be further appreciated that the density may be any value within a range between any numerical values between the maximum and minimum values noted above.

MoE may be determined using e-mod acoustic frequency measurement according to ASTM C1259. In one embodiment, the body may have a MoE of greater than about 180 GPa, such as, greater than about 185 GPa, greater than about 190 GPa, greater than about 195 GPa or even greater about 200 GPa, as measured at room temperature using the 4 point test. In still other instances, the body may have a MoE of not greater than about 210 GPa, such as, not greater than about 200 GPa, not greater than about 195 GPa, not greater than about 190 GPa or even not greater than about 185 GPa. It will be appreciated that the MoE may be any value within a range between any of the maximum and minimum values noted above. It will be further appreciated that the MoE may be any value within a range between any numerical values between the maximum and minimum values noted above.

Vickers hardness may be determined according to ASTM E384. In one embodiment, the body of the component may have a Vickers hardness of greater than about 6.1 GPa, such as, greater than about 6.2 GPa, greater than about 6.3 GPa, greater than about 6.4 GPa, greater than about 6.5 GPa, greater than about 6.6 GPa, greater than about 6.7 GPa, greater than about 6.8 GPa, greater than about 6.9 GPa, greater than about 7.0 GPa, greater than about 7.1 GPa, greater than about 7.2 GPa, greater than about 7.3 GPa, greater than about 7.4 GPa, greater than about 7.5 GPa, greater than about 7.6 GPa, greater than about 7.7 GPa, greater than about 7.8 GPa or even greater about 7.9 GPa. The body may also have a Vickers hardness not greater than about 8.0 GPa, such as, not greater than about 8.0 GPa, not greater than about 7.9 GPa, not greater than about 7.8 GPa, not greater than about 7.7 GPa, not greater than about 7.6 GPa, not greater than about 7.5 GPa, not greater than about 7.4 GPa, not greater than about 7.3 GPa, not greater than about 7.2 GPa, not greater than about 7.1 GPa, not greater than about 7.0 GPa, not greater than about 6.9 GPa, not greater than about 6.8 GPa, not greater than about 6.7 GPa, not greater than about 6.6 GPa, not greater than about 6.5 GPa, not greater than about 6.4 GPa, not greater than about 6.3 GPa, not greater than about 6.2 GPa or even not greater than about 6.1 GPa. It will be appreciated that the Vickers hardness may be any value within a range between any of the maximum and minimum values noted above. It will be further appreciated that the Vickers hardness may be any value within a range between any numerical values between the maximum and minimum values noted above.

Creep strain rate may be measure using an isothermal creep test. In an isothermal creep test, a four point bending test configuration may be used where the distance L between the outer supports may be 80 mm and the distance 1 between the inner supports may be 40 mm. A sample bar having a height of 8 mm, a width of 9 mm and a length of 100 mm was placed on these supports and a stress of 2 MPa may be applied at the center of the sample bar. The temperature may be maintained a constant 1275° C. or a 1300° C. The change in sag (in mm) of the sample bar over 50 hours may be recorded and the strain deformation of the bar may also be computed using the Hollenberg equations. The mean deformation of creep rate (Vd), given in ppm/hr, may then be calculated. Average and median values of creep strain rate may be derived from a statistically relevant sample size.

In one embodiments, the body may have a creep strain rate of not greater than about 50.0 ppm/h, such as, not greater than about 40 ppm/h, not greater than about 30 ppm/h, not greater than about 20 ppm/h, not greater than about 10 ppm/h, not greater than about 5 ppm/h, not greater than about 3.0 ppm/h, not greater than about 1.5 ppm/h, not greater than about 1.0 ppm/h, not greater than about 0.5 ppm/h or even not greater about 0.25 ppm/h, measured at 1275° C. over a period of 50 hours. In still other instances, the body may have a creep strain rate of greater than about 0.15 ppm/h, such as, greater than about 0.25 ppm/h, greater than about 0.5 ppm/h, greater than about 1.0 ppm/h, greater than about 1.5 ppm/h, greater than about 3 ppm/h, greater than about 5 ppm/h, greater than about 10 ppm/h, greater than about 20 ppm/h, greater than about 30.0 ppm/h or even greater than about 40 ppm/h measured at 1275° C. over a period of 50 hours. It will be appreciated that the creep strain rate at 1275° C. may be any value within a range between any of the maximum and minimum values noted above. It will be further appreciated that the creep strain rate at 1275° C. may be any value within a range between any numerical values between the maximum and minimum values noted above. The values above may represent average or median values of creep strain rate derived from a statistically relevant sample size.

In one embodiment, the body may have a creep strain rate of not greater than about 50.0 ppm/h, such as, not greater than about 40 ppm/h, not greater than about 30 ppm/h, not greater than about 20 ppm/h, not greater than about 10 ppm/h, not greater than about 5 ppm/h, not greater than about 3.0 ppm/h, not greater than about 1.5 ppm/h, not greater than about 1.0 ppm/h, not greater than about 0.5 ppm/h or even not greater about 0.25 ppm/h, measured at 1300° C. over a period of 50 hours. In still other instances, the body may have a creep strain rate of greater than about 0.15 ppm/h, such as, greater than about 0.25 ppm/h, greater than about 0.5 ppm/h, greater than about 1.0 ppm/h, greater than about 1.5 ppm/h, greater than about 3 ppm/h, greater than about 5 ppm/h, greater than about 10 ppm/h, greater than about 20 ppm/h, greater than about 30.0 ppm/h or even greater than about 40 ppm/h measured at 1300° C. over a period of 50 hours. It will be appreciated that the creep strain rate at 1300° C. may be any value within a range between any of the maximum and minimum values noted above. It will be further appreciated that the creep strain rate at 1300° C. may be any value within a range between any numerical values between the maximum and minimum values noted above.

Crucible blistering may be determined using a crucible blistering test. In a crucible blistering test, a crucible is core drilled from a sample block. The crucible may have a height of 40 mm and a diameter of 50 mm, with a hole in the middle of the crucible having a height of 30 mm and a diameter of 30 mm. Once prepared, the crucible may be cleaned using DI water in an ultrasonic bath to eliminate any possible residues from machining and then dried. Once dried, the crucible may be filled with 20 g of broken pieces of glass and then heated up to the testing temperature and soaked for an extended period of time (72 h or 120 h, or 360 h). After the soak is completed the crucible is cooled down to room temperature. The crucible is then cut vertically to expose the glass and blistering intensity is observed. In one test, materials may be tested at 1200° C. in LCD glass A for 360 h. In yet another test, material may be tested at 1250° C. for 72 h in LCD glass A. In another test, material may be tested with LTPS glass B at 1250° C. for 360 h.

Blistering may be alternatively tested using a plaque blistering test. In a plaque blistering test, a 5×15×15 mm plaque of the material to test may be cut and then polished (30 micron grit). The plaque may be cleaned using DI water in an ultrasonic bath to eliminate any possible residues from machining and dried. The plaque may be positioned in a 99.9% $Al_2O_3$ bonded crucible (25 mm of diameter, 40 mm of height, 2 mm of wall thickness) in between 2 horizontal layers of glass totaling approximately 20 g of glass. The plaque may then be heated up to the testing temperature and maintained at the testing temperature for an extended period of time. After the soak is completed, the plaque may be cooled down and cut to expose the glass. The plaque may then be cut vertically to expose the glass and blistering intensity is observed. In one instance, the test may be run at 1250° C. for 120 h with LCD glass A.

Notably, blistering (i.e., crucible blistering or plaque blistering) in components that include zircon formed according to embodiments described herein has been determined to be lower as compared to conventional zircon-based materials formed according to conventional methods.

Figure 3:
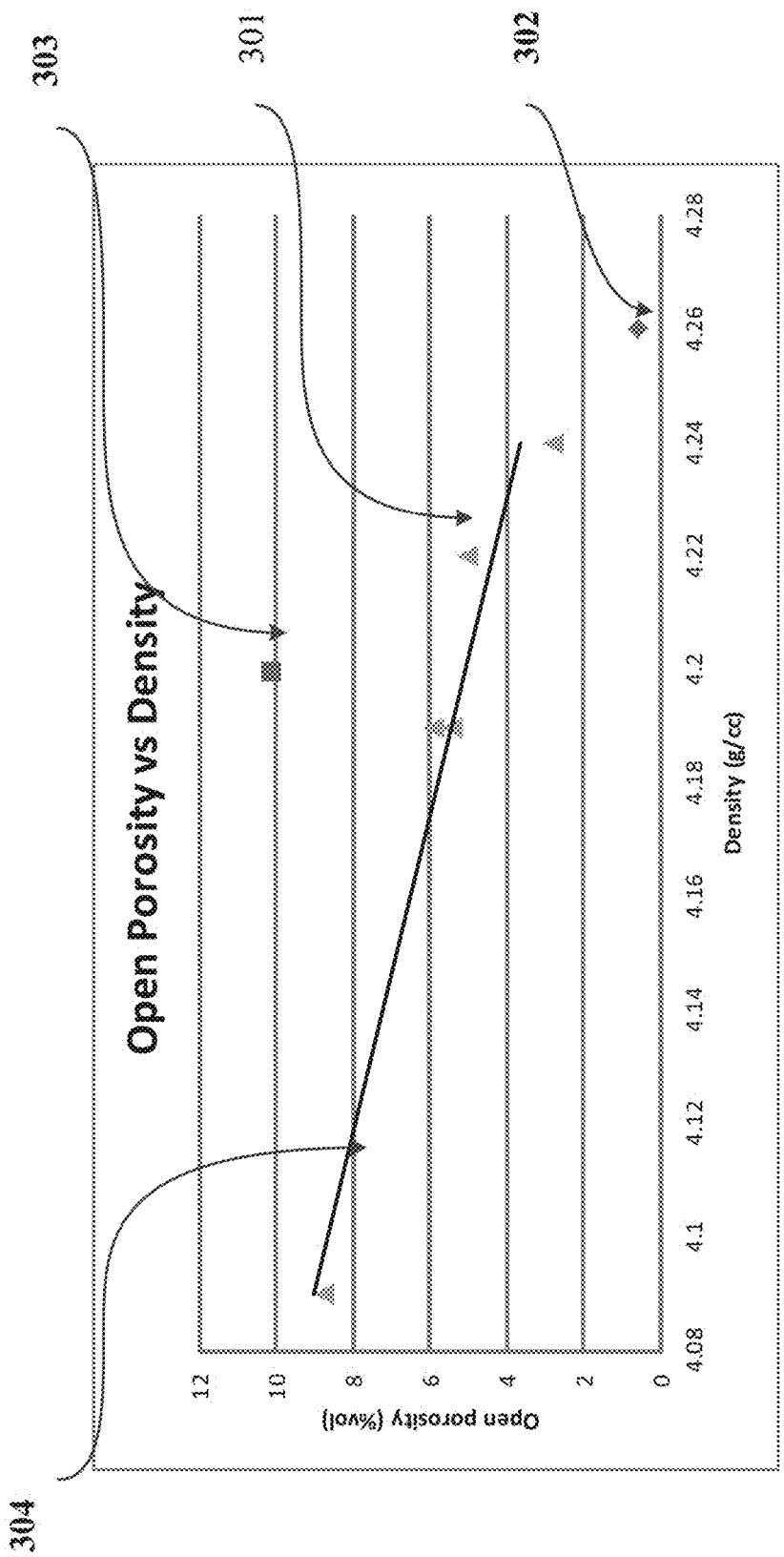
FIG. 3 includes a open porosity vs. density scatter plot comparing data points corresponding to components formed in accordance with embodiments and components formed according to conventional processes.

Another particular embodiment of a component formed as described above may include a body that may include a particular Open Porosity/Density Zero Point (PDZP). FIG. 3 is an open porosity vs. density scatter plot comparing data points corresponding to components formed according to embodiments described herein and components formed according to conventional processes. Data points 301 correspond to values of open porosity and density for the components of the embodiments herein, and such values may be used to derive an open porosity/density ratio value (OP/D) for each component. Data points 302 and 303 correspond to values of open porosity and density for multiple example components formed according to convention processes, which may be used to derive open porosity/density ratio values for each of the example components. PDZP is a value extrapolated from the linear regression of data points 301 and may be calculated for any given component based on the equation PDZP=OP+35.844*D, where D is the density of the body of the component and OP is the open porosity of the body of the component.

According to one embodiment, the component may include a body that may include a PDZP of at least about 154, such as, at least about 155, at least about 156, at least about 157 or even at least about 158. According to another embodiment, the component may include a body that may include a PDZP of not greater than about 159, such as, not greater than about 158, not greater than about 157, not greater than about 156, not greater than about 155 or even not greater than about 155. It will be appreciated that the PDZP may be any value within a range between any of the maximum and minimum values noted above. It will be further appreciated that the PDZP may be any value within a range between any numerical values between the maximum and minimum values noted above.

In particular instances, the bodies of the components herein may have a particular open porosity for a given density value. For example, in certain instances, the a body having a density of approximately 4.1 g/cc (plus or minus 0.5 g/cc), the open porosity may be within a range between about 5.5 vol % and about 12 vol %. Moreover, for a body having a density of not greater than about 4.15 g/cc (plus or minus 0.5 g/cc), the open porosity may be within a range between about 5.5 vol % and about 9 vol %. In other instances, for a body having a density of not greater than about 4.2 g/cc (plus or minus 0.5 g/cc), the open porosity may be within a range between about 4.5 vol % and about 9 vol %. In other instances, for a body having a density of not greater than about 4.25 g/cc (plus or minus 0.5 g/cc), the open porosity may be within a range between about 3 vol % and about 9 vol %.

Another particular embodiment of a component formed as described above may include a body including zircon grains, the body having an outer portion and an interior portion. The body may have a free silica intergranular phase present between the zircon grains. The free silica intergranular phase may include free silica, wherein the body comprises a content of free silica not greater than about 2 wt. % for the total weight of the body. Further, the body may suffer a dynamic corrosion rate of not greater than about 100 μm/day.

Dynamic corrosion rate may be tested at 1550° C. in alkali-free borosilicate testing glass with a rotating speed of 0.04 RPM for 72-90 hours. Dynamic corrosion rate may be tested by drilling a core sample from a block to form a 20 mm OD×100 mm long finger. These samples (up to 6 per test) are then hung using a ceramic sample holder and equally distributed around 800 mm diameter circle. During the test, the samples may be partially immerged in a platinum crucible filled with the testing glass. After the test, the samples are removed from the glass and then cooled down. The remaining volume of the samples after the test may be used to calculate the corrosion rate along the diameter of the sample.

In one embodiment, the body may suffer dynamic corrosion rate of not greater than about 90 μm/day, such as, not greater than about 80 μm/day, not greater than about 70 μm/day or even not greater than about 60 μm/day. In still other instances, the body may suffer dynamic corrosion of greater than about 50 μm/day, such as, greater than about 60 μm/day, greater than about 70 μm/day, greater than about 80 μm/day or even greater about 90 μm/day. It will be appreciated that the body may suffer dynamic corrosion of any value within a range between any of the maximum and minimum values noted above. It will be further appreciated that the body may suffer dynamic corrosion of any value within a range between any numerical values between the maximum and minimum values noted above.

Another particular embodiment of a component formed as described above may include a body including zircon grains, the body having an outer portion and an interior portion. The intersection of the outer portion and the inner portion may be measured at a depth of 5000 μm from an outer surface of the body. The body may have a free silica intergranular phase present between the zircon grains. The free silica intergranular phase may include free silica, wherein the body comprises a content of free silica not greater than about 2 wt. % for the total weight of the body. Further, the interconnectivity of the free silica intergranular phase in the outer portion of the body may be greater than about 10%.

In other embodiments, the interconnectivity of the free silica intergranular phase in the outer portion of the body may be greater than about 15%, such as, greater than about 20%, greater than about 25%, greater than about 30%, greater than about 35%, greater than about 40%, greater than about 45%, greater than about 50%, greater than about 55%, greater than about 60%, greater than about 65%, greater than about 70%, greater than about 75%, greater than about 80%, greater than about 85%, greater than about 90% or even greater about 95%. In still other instances, the interconnectivity of the free silica intergranular phase in the outer portion of the body may be not greater than about 100%, such as, not greater than about 95%, not greater than about 90%, not greater than about 85%, not greater than about 80%, not greater than about 75%, not greater than about 70%, not greater than about 65%, not greater than about 60%, not greater than about 55%, not greater than about 50%, not greater than about 45%, not greater than about 40%, not greater than about 35%, not greater than about 30%, not greater than about 25%, not greater than about 20%, or even not greater than about 15%. It will be appreciated that the interconnectivity of the free silica intergranular phase in the outer portion of the body may be any value within a range between any of the maximum and minimum values noted above. It will be further appreciated that the interconnectivity of the free silica intergranular phase in the outer portion of the body may be any value within a range between any numerical values between the maximum and minimum values noted above.

Notably, the body may have a particular ratio of the interconnectivity of the free silica intergranular phase in the outer portion of the body ($IC_{op}$) to the interconnectivity of the free silica intergranular phase in the interior portion of the body ($IC_{ip}$). The ratio may be expressed mathematically as $IC_{op}/IC_{ip}$. $IC_{op}$ can represent the interconnectivity of the free silica intergranular phase in the outer portion of the body. $IC_{ip}$ can represent the interconnectivity of the free silica intergranular phase in the interior portion of the body. In certain embodiments, the body may include an interconnectivity ratio $IC_{op}/IC_{ip}$ of greater than about 0.8, such as, greater than about 0.85, greater than about 0.9, greater than about 0.95 or even greater about 0.99. In other embodiments, the body may include an interconnectivity ratio $IC_{op}/IC_{ip}$ of about 1. In still other embodiments, the body may include an interconnectivity ratio $IC_{op}/IC_{ip}$ of not greater than about 1.2, such as, not greater than about 1.15, not greater than about 1.1, not greater than about 1.1 or even not greater than about 1.05. It will be appreciated that the interconnectivity ratio $IC_{op}/IC_{ip}$ may be any value within a range between any of the maximum and minimum values noted above. It will be further appreciated that the interconnectivity ratio $IC_{op}/IC_{ip}$ may be any value within a range between any numerical values between the maximum and minimum values noted above.

Figure 4:
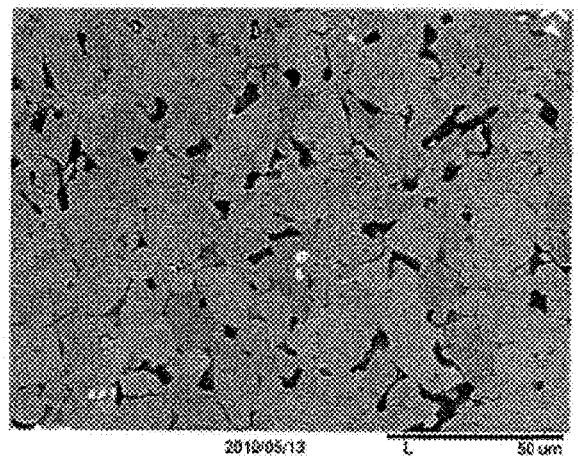
FIG. 4 includes an image of the microstructure of a component including zircon in accordance with an embodiment.
Figure 5:
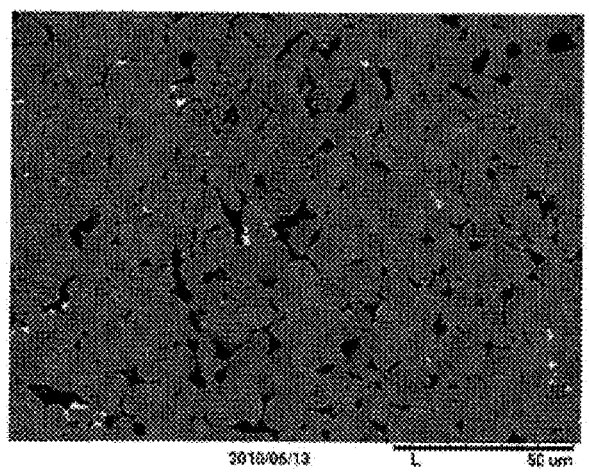
FIG. 5 includes an image of the microstructure of a conventional component including zircon subject to hydrogen fluoride (HF) treatment.

FIG. 4 illustrates an image of the microstructure of a zircon component formed according to embodiments described herein. FIG. 5 illustrates the microstructure of a zircon component formed according to conventional methods, which includes treating the outer portion of a zircon component with and HF solution. In FIGS. 4 and 5, zircon grains appear grey, free silica appears light grey and apparent porosity in the surface of the sample appears black. Notably, there is a significantly less amount of free silica (light grey) shown in the image of the microstructure of the zircon component formed according to conventional methods, as shown in FIG. 5, than there is in the microstructure of the zircon component formed according to embodiments described herein, as shown in FIG. 4. Further, there is a significantly greater amount of apparent porosity (black), shown in the image of the microstructure of the zircon component formed according to conventional methods, as shown in FIG. 5, than there is in the microstructure of the zircon component formed according to embodiments described herein, as shown in FIG. 4.

Figure 6:
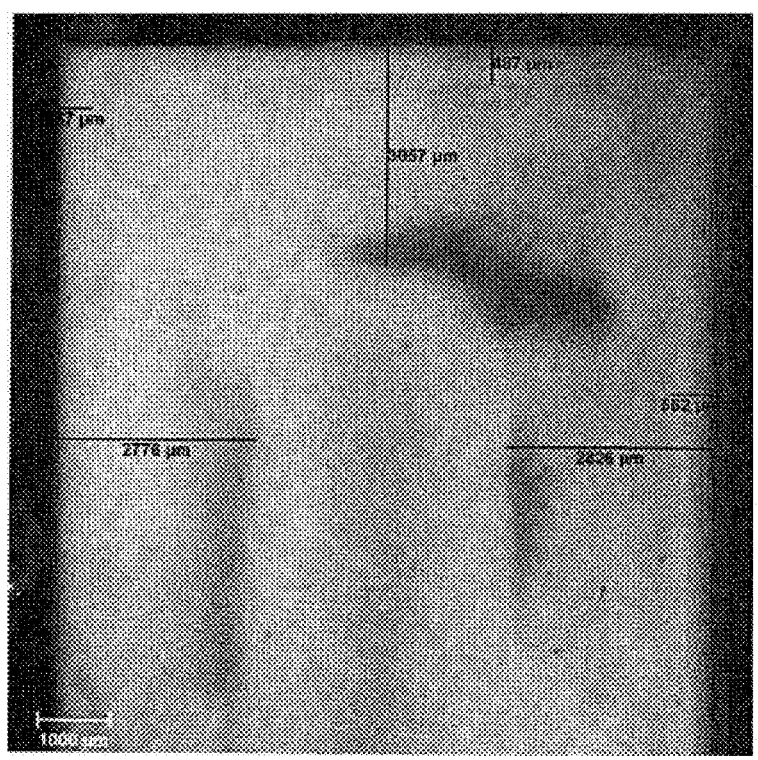
FIG. 6 includes an image of a portion of a conventional component including zircon treated with hydrogen fluoride (HF).

FIG. 6 illustrates an image of a portion of a conventional component including zircon treated with hydrogen fluoride (HF). Notably, FIG. 5 shows that the free silica is not distributed substantially uniformly throughout the full body of the conventional component, and notable the content of free silica at the interior of the body is significantly greater than the content of free silica at the outer portion.

EXAMPLES

Turning to particular working examples, multiple compositions were prepared and tested, the examples being formed according to embodiments described herein.

Table 1 summarizes the composition and measured physical characteristics of Examples 1-9. Examples 1-9 are examples of zircon components formed according to embodiments described herein.

TABLE 1

Example Zircon Materials Formed According to Embodiments Described Herein

| | Example 1 | Example 2 | Example 3 | Example 4 | Example 5 | Example 6 | Example 7 | Example 8 | Example 9 |
|---|---|---|---|---|---|---|---|---|---|
| Total FS in batch (wt. %) | 0.5 | 0.5 | 0.5 | 0.5 | 0.5 | 0.2 | 0.4 | 0.5 | 0.4 |
| Total $Al_2O_3$ in batch (wt. %) | 0.24 | 0.1 | 0.1 | 0.35 | 0.1 | 0.13 | 0.03 | 0.13 | 0.03 |
| Density (g/cm3) | 4.11 | 4.38 | 4.19 | 4.14 | 4.36 | 4.29 | 4.45 | 4.49 | 4.43 |
| Open porosity (vol %) | 8.0 | 0.4 | 5.9 | 7.2 | 0.2 | 0.9 | 0.1 | 0.2 | 0.4 |
| FS after sintering (wt. %) | 1.1 | 0.9 | 0.5 | 1.0 | 0.9 | 0.4 | 0.7 | 0.75 | 0.56 |
| Creep rate at 1275° C. 2 MPa-50 h (ppm/h) | 27.1 | 5.2 | 1.9 | 21.2 | 5.8 | | | | |
| Creep rate at 1300° C. 2 MPa-50 h (ppm/h) | 50.1 | 7.1 | | 39 | | | | 17.8 | 8.1 |
| Crucible blistering - LCD A 1200° C.-360 h | | Low | | Low | Low | | | | |
| Plaque blistering in LCD A at 1250° C.-120 h | | | | | | | Low | Low | |
| Crucible blistering - LCD A 1250° C.-72 h | | | Low | | | | | | |
| Crucible blistering - LTPS B 1250° C.-360 h | | Low | | Low | Low | | | | |
| RT MOR (MPa) - 4 points bending test | | 113.3 | | 88.3 | 128.2 | | | | |
| RT MOE (GPa) - ASTM C1259 | | 227 | | 187 | 226.7 | | | | |
| K1c (MPa · $m^{1/2}$) - ASTM E384-89 by indentation | | 1.85 | | 1.67 | | | | | |
| Hardnes (Hv) (GPa) | | 8.0 | 8.0 | 7.6 | | | | | |
| Open Porosity/Density Zero Point (PDZP) | 155.3 | 157.4 | 156.1 | 155.6 | 156.5 | 154.7 | 159.6 | 161.1 | 159.2 |

Examples 1-9 were formed from unprocessed raw material comprising zircon and other components. The unprocessed raw material was first milled to a finer particle size and combined with sintering aids ($Ta_2O_5$ or $TiO_2$) and, in certain instances, other additives ($Al_2O_3$, $SiO_2$ (quartz), $Fe_2O_3$, etc.) to form a batch.

The unprocessed raw material used in Example 1 was milled in a dry ball mill with zircon media. The milling process added impurities to the powder by contamination from the media (i.e., $SiO_2$, $Al_2O_3$, CaO, MgO, $Fe_2O_3$).

The raw materials used in Examples 2-9 were milled in a wet ball mill with high purity zirconia media. The wt. % of solids in the slurry was kept to approximately 60 wt. % for the total weight of the slurry. The sintering aid ($TiO_2$ or $Ta_2O_5$) and other additives were added before the milling process.

In Example 1, the batch comprised approximately 99 wt. % milled material A for the total weight of the batch and 1 wt. % $Ta_2O_5$ for the total weight of the batch. Milled material A was milled to a median (D50) particle size of 3.8 µm. Milled material A included a content of $Al_2O_3$ of 0.24 wt. % for the total weight of the milled material A. Milled material A further included a content of free silica of 0.51 wt. % for the total weight of the milled material A. The total contents of the batch added up to be 100%.

In Example 2, the batch comprised approximately 99 wt. % milled material B for the total weight of the batch and 1 wt. % $Ta_2O_5$ for the total weight of the batch. Milled material B was milled to a median (D50) particle size of 4.8 µm. Milled material B included a content of $Al_2O_3$ of 0.10 wt. % for the total weight of the milled material B. Milled material B further included a content of free silica of 0.47 wt. % for the total weight of the milled material B. The total contents of the batch added up to be 100%.

In Example 3, the batch comprised approximately 99 wt. % milled material G for the total weight of the batch and 1 wt. % $Ta_2O_5$ for the total weight of the batch. Milled material G was milled to a median (D50) particle size of 4.5 µm. Milled material G included a content of $Al_2O_3$ of 0.11 wt. % for the total weight of the milled material G. Milled material G further included a content of free silica of 0.45 wt. % for the total weight of the milled material G. The total content of the batch added up to be 100%.

In Example 4, the batch comprised approximately 98.75 wt. % milled material B for the total weight of the batch, 1 wt. % $Ta_2O_5$ for the total weight of the batch and 0.25 wt. 5 $Al_2O_3$ for the total weight of the batch. Milled material B was milled to a median (D50) particle size of 4.8 µm. Milled material B included a content of $Al_2O_3$ of 0.10 wt. % for the total weight of the milled material B. Milled material B further included a content of free silica of 0.47 wt. % for the total weight of the milled material B. The total content of the batch added up to be 100%.

In Example 5, the batch comprised approximately 99.2 wt. % milled material B for the total weight of the batch and 0.8 wt. % $Ta_2O_5$ for the total weight of the batch. Milled material B was milled to a median (D50) particle size of 4.8 µm. Milled material B included a content of $Al_2O_3$ of 0.10 wt. % for the total weight of the milled material B. Milled material B further included a content of free silica of 0.47 wt. % for the total weight of the milled material B. The total content of the batch added up to be 100%.

In Example 6, the batch comprised approximately 99.5 wt. % milled material C for the total weight of the batch and 0.5 wt. % $TiO_2$ for the total weight of the batch. Milled material C was milled to a median (D50) particle size of 2.8 µm. Milled material C included a content of $Al_2O_3$ of 0.12 wt. % for the total weight of the milled material C. Milled material C further included a content of free silica of 0.17 wt. % for the total weight of the milled material C. The total content of the batch added up to be 100%.

In Example 7, the batch comprised approximately 99.5 wt. % milled material D for the total weight of the batch and 0.5 wt. % $TiO_2$ for the total weight of the batch. Milled material D was milled to a median (D50) particle size of 2.9 µm. Milled material D included a content of $Al_2O_3$ of 0.03 wt. % for the total weight of the milled material D. Milled material D further included a content of free silica of 0.4 wt. % for the total weight of the milled material D. The total content of the batch added up to be 100%.

In Example 8, the batch comprised approximately 99 wt. % milled material E for the total weight of the batch and 1 wt. % $Ta_2O_5$ for the total weight of the batch. Milled material E was milled to a median (D50) particle size of 4.8 µm. Milled material E included a content of $Al_2O_3$ of 0.1 wt. % for the total weight of the milled material E. Milled material E further included a content of free silica of 0.5 wt. % for the total weight of the milled material E. The total content of the batch added up to be 100%.

In Example 9, the batch comprised approximately 99 wt. % milled material F for the total weight of the batch and 1 wt. % $Ta_2O_5$ for the total weight of the batch. Milled material F was milled to a median (D50) particle size of 4.9 µm. Milled material F included a content of $Al_2O_3$ of 0.03 wt. % for the total weight of the milled material F. Milled material F further included a content of free silica of 0.4 wt. % for the total weight of the milled material F. The total content of the batch added up to be 100%.

In Example 1-9, the combined materials were then spray dried and the spray dried granules were pressed into a block shape in a cold isostatic press at room temperature under a pressure of 100 MPa and 140 MPa. The blocks were then sintered at a maximum temperature of 1600° C. for 28 h.

Table 2 summarizes the composition and physical characteristics of Examples 10 and 11. Examples 10 and 11 are examples of zircon components formed according to conventional methods.

TABLE 2

Example Zircon Materials Formed According to Embodiments Described Herein

| | Example 10 | Example 11 |
|---|---|---|
| Total FS in batch (wt. %) | 1.8 | 1.8 |
| Total $Al_2O_3$ in batch (wt. %) | 0.3 | 0.3 |
| Density (g/cm3) | 4.26 | 4.26 |
| Open porosity (vol %) | 0.6 | 10.1 |
| FS after sintering (wt. %) | 2.37 | <1.0 |
| Creep rate at 1275° C. 2 MPa - 50 h (ppm/h) | 4.5 | 6.3 |
| Creep rate at 1300° C. 2 MPa - 50 h (ppm/h) | | |
| Crucible blistering - LCD A 1200° C. - 360 h | High | Low |
| Plaque blistering in LCD A at 1250° C. - 120 h | High | Low |
| Crucible blistering - LCD A at 1250° C. - 72 h | High | Low |
| Crucible blistering - LTPS B 1250° C. - 360 h | High | Low |
| RT MOR (MPa) - 4 points bending test | 130 | 39 |
| RT MOE (GPa) - ASTM C1259 | 210 | 174 |
| K1c (MPa · $m^{1/2}$) - ASTM E384-89 by indentation | 1.64 | 1.51 |
| Hardnes (Hv) (GPa) | 7.3 | 6.0 |
| Open Porosity/Density Zero Point (PDZP) | 153.3 | 160.7 |

In Example 10, the unprocessed raw materials were prepared using a dry milled zircon material. The sintering aid ($Ta_2O_5$) was added to the zircon before mixing in the blunge tank to form a slurry. The slurry was then spray dried and the powder pressed and fired under the same conditions at the other examples.

In Example 10, the batch comprised 99 wt. % milled material H for the total weight of the batch and 1 wt. % $Ta_2O_5$ for the total weight of the batch. Milled material H was milled to a median (D50) particle size of 5.4 μm. Milled material H included a content of $Al_2O_3$ of 0.3 wt. % for the total weight of the milled material H. Milled material G further included a content of free silica of 1.8 wt. % for the total weight of the milled material H.

Figure 7:
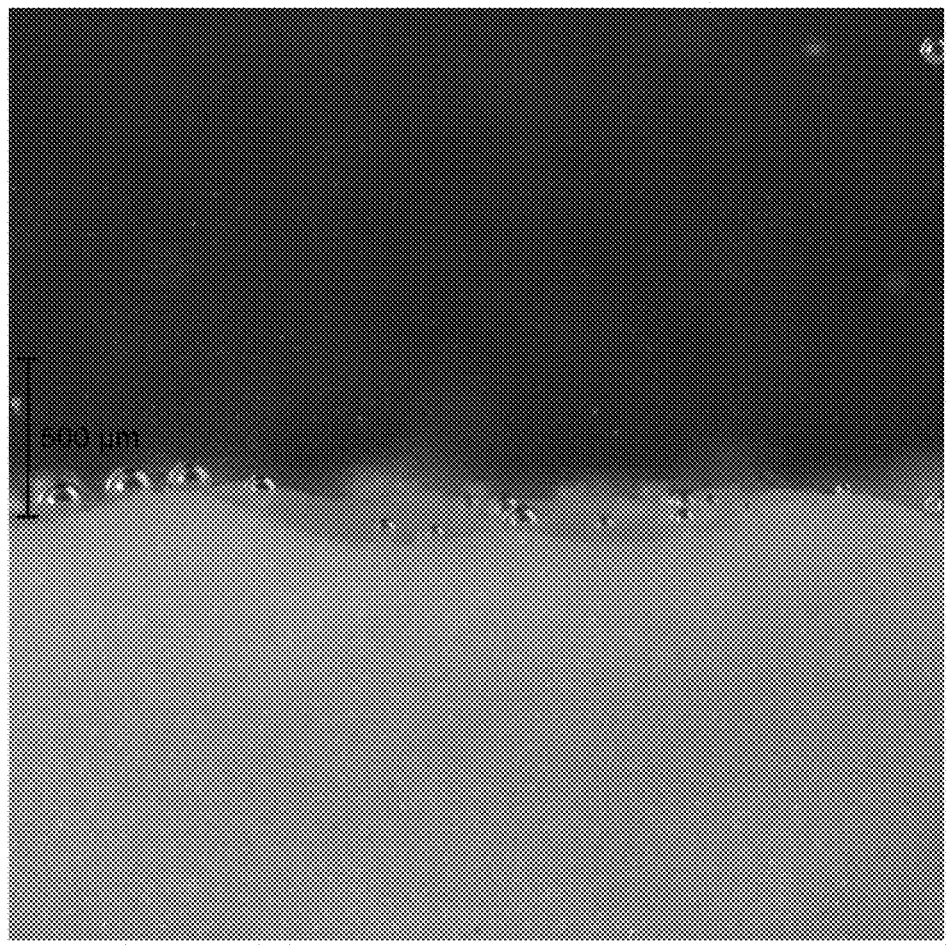
FIG. 7 includes an image of the surface of a convention component including zircon.

FIG. 7 illustrates an image of the surface of a zircon component formed according to Example 10. Note that the zircon component formed according to Example 10, which included relatively high amounts of free silica (i.e., greater than 2 wt. % for the total weight of the zircon body), shows relatively high blistering (i.e., crucible blistering or plaque blistering).

In Example 11, the unprocessed raw materials were prepared using a dry milled zircon material. The sintering aid ($Ta_2O_5$) was added to the zircon before mixing in the blunge tank to form a slurry. The slurry was then spray dried and the powder pressed and fired under the same conditions at the other examples.

In Example 11, the batch comprised 99 wt. % milled material H for the total weight of the batch and 1 wt. % $Ta_2O_5$ for the total weight of the batch. Milled material H was milled to a median (D50) particle size of 5.4 μm. Milled material H included a content of $Al_2O_3$ of 0.3 wt. % for the total weight of the milled material H. Milled material G further included a content of free silica of 1.8 wt. % for the total weight of the milled material H.

In Example 11, after formation of the block, the material was placed in a 20% HF water solution at room temperature for 72 hours. During this process, most of the free silica present at the grain boundaries in the outer portion of the body is removed. Such treatment has been found to likely reduce the mechanical strength and is therefore not desirable.

Table 3 summarizes the composition and measured physical characteristics of Examples 12-16. Examples 12-16 are additional examples of zircon components formed according to embodiments described herein.

TABLE 3

Example Zircon Materials Formed According to Embodiments Described Herein

| | Example 12 | Example 13 | Example 14 | Example 15 | Example 16 | Example 17 | Example 18 | Example 19 | Example 20 |
|---|---|---|---|---|---|---|---|---|---|
| Total FS in batch (wt. %) | 0.5 | 0.5 | 0.5 | 0.5 | 0.5 | 0.5 | 0.5 | 0.5 | 0.5 |
| Total $Al_2O_3$ in batch (wt. %) | 0.2 | 0.15 | 0.2 | 0.18 | 0.24 | 0.21 | 0.23 | 0.27 | 0.32 |
| Density (g/cm3) | 4.19 | 4.37 | 4.23 | 4.22 | 4.09 | 4.27 | 4.15 | 4.09 | 4.05 |
| Open Porosity (vol %) | 5.4 | 0.2 | 2.8 | 5.0 | 8.79 | 4.0 | 6.7 | 8.04 | 9.21 |
| FS after sintering (wt. %) | 0.6 | 0.6 | 0.8 | 0.8 | 0.7 | 0.8 | 0.8 | 0.8 | 0.8 |
| Creep rate at 1275° C. 2 MPa-50 h (ppm/h) | 4.7 | 6.5 | 3.6 | 5.6 | 7.0 | 5.1 | 4.6 | 5.3 | 7.1 |
| Creep rate at 1300° C. 2 MPa-50 h (ppm/h) | | | | 11.2 | 15.2 | | | | |
| Crucible blistering - LCD A 1200° C.-360 h | | Low | Low | Low | Low | Low | Low | Low | Low |
| Plaque blistering in LCD A at 1250° C.-120 h | | | | | | | | | |
| Crucible blistering - LCD A 1250° C.-72 h | Low | | | | | | | | |
| Crucible blistering - LTPS B 1250° C.-360 h | | Low | Low | Low | Low | Low | Low | Low | Low |
| RT MOR (MPa) - 4 points bending test | | | 131 | | | | | | |
| RT MOE (GPa) - ASTM C1259 | | | 147 | | | | | | |
| K1c (MPa·$m^{1/2}$) - ASTM E384-89 by indentation | | | | 1.67 | | | | | |
| Hardnes (Hv) (GPa) | | | | 7.6 | | | | | |
| Open Porosity/Density Zero Point (PDZP) | 155.6 | 156.9 | 154.4 | 156.3 | 155.4 | 157.1 | 155.5 | 154.7 | 154.4 |

Examples 12-20 were formed from raw material comprising zircon and other components. The raw material was first milled to a finer particle size and combined with sintering aids ($Ta_2O_5$ or $TiO_2$) and, in certain instances, other additives ($Al_2O_3$, $SiO_2$ (quartz), $Fe_2O_3$, etc.) to form a batch.

The unprocessed raw materials used in Examples 12-20 were milled in a jet mill. The sintering aid ($Ta_2O_5$) and other additives were added after the milling process.

In Example 12, the batch comprised approximately 98.95 wt. % milled material I for the total weight of the batch and 1 wt. % $Ta_2O_5$ for the total weight of the batch. Milled material I was milled to a median (D50) particle size of 5.0 μm. Milled material I included a content of $Al_2O_3$ of 0.15 wt. % for the total weight of the milled material I. Milled material I further included a content of free silica of 0.5 wt. % for the total weight of the milled material I. The total contents of the batch added up to be 100%.

In Example 13, the batch comprised approximately 99.0 wt. % milled material I for the total weight of the batch and 1 wt. % $Ta_2O_5$ for the total weight of the batch. Milled material I was milled to a median (D50) particle size of 5.0 μm. Milled material I included a content of $Al_2O_3$ of 0.15 wt. % for the total weight of the milled material I. Milled material I further included a content of free silica of 0.5 wt. % for the total weight of the milled material I. The total contents of the batch added up to be 100%.

In Example 14, the batch comprised approximately 98.95 wt. % milled material I for the total weight of the batch and 1 wt. % $Ta_2O_5$ for the total weight of the batch. Milled material I was milled to a median (D50) particle size of 5.0 μm. Milled material I included a content of $Al_2O_3$ of 0.15 wt. % for the total weight of the milled material I. Milled material I further included a content of free silica of 0.5 wt. % for the total weight of the milled material I. The total contents of the batch added up to be 100%.

In Example 15, the batch comprised approximately 98.95 wt. % milled material J for the total weight of the batch and 1 wt. % $Ta_2O_5$ for the total weight of the batch. Milled material J was milled to a median (D50) particle size of 3.5 μm. Milled material J included a content of $Al_2O_3$ of 0.12 wt. % for the total weight of the milled material J. Milled material j further included a content of free silica of 0.5 wt. % for the total weight of the milled material J. The total contents of the batch added up to be 100%.

In Example 16, the batch comprised approximately 98.95 wt. % milled material J for the total weight of the batch and 1 wt. % $Ta_2O_5$ for the total weight of the batch. Milled material J was milled to a median (D50) particle size of 3.5 μm. Milled material J included a content of $Al_2O_3$ of 0.12 wt. % for the total weight of the milled material J. Milled material j further included a content of free silica of 0.5 wt. % for the total weight of the milled material J. The total contents of the batch added up to be 100%.

In Example 17, the batch comprised approximately 98.94 wt. % milled material I for the total weight of the batch and 1 wt. % $Ta_2O_5$ for the total weight of the batch. Milled material I was milled to a median (D50) particle size of 5.0 μm. Milled material I included a content of $Al_2O_3$ of 0.15 wt. % for the total weight of the milled material I. Milled material I further included a content of free silica of 0.5 wt. % for the total weight of the milled material I. The total contents of the batch added up to be 100%.

In Example 18, the batch comprised approximately 98.92 wt. % milled material I for the total weight of the batch and 1 wt. % $Ta_2O_5$ for the total weight of the batch. Milled material I was milled to a median (D50) particle size of 5.0 μm. Milled material I included a content of $Al_2O_3$ of 0.15 wt. % for the total weight of the milled material I. Milled material I further included a content of free silica of 0.5 wt. % for the total weight of the milled material I. The total contents of the batch added up to be 100%.

In Example 19, the batch comprised approximately 98.88 wt. % milled material I for the total weight of the batch and 1 wt. % $Ta_2O_5$ for the total weight of the batch. Milled material I was milled to a median (D50) particle size of 5.0 μm. Milled material I included a content of $Al_2O_3$ of 0.15 wt. % for the total weight of the milled material I. Milled material I further included a content of free silica of 0.5 wt. % for the total weight of the milled material I. The total contents of the batch added up to be 100%.

In Example 20, the batch comprised approximately 98.84 wt. % milled material I for the total weight of the batch and 1 wt. % $Ta_2O_5$ for the total weight of the batch. Milled material I was milled to a median (D50) particle size of 5.0 μm. Milled material I included a content of $Al_2O_3$ of 0.15 wt. % for the total weight of the milled material I. Milled material I further included a content of free silica of 0.5 wt. % for the total weight of the milled material I. The total contents of the batch added up to be 100%.

In Example 12-20, the combined materials were then spray dried and the spray dried granules were pressed into a block shape in a cold isostatic press at room temperature under a pressure of 100 MPa and 140 MPa. The blocks were then sintered at a maximum temperature of 1600° C. for 28 h.

Figure 8:
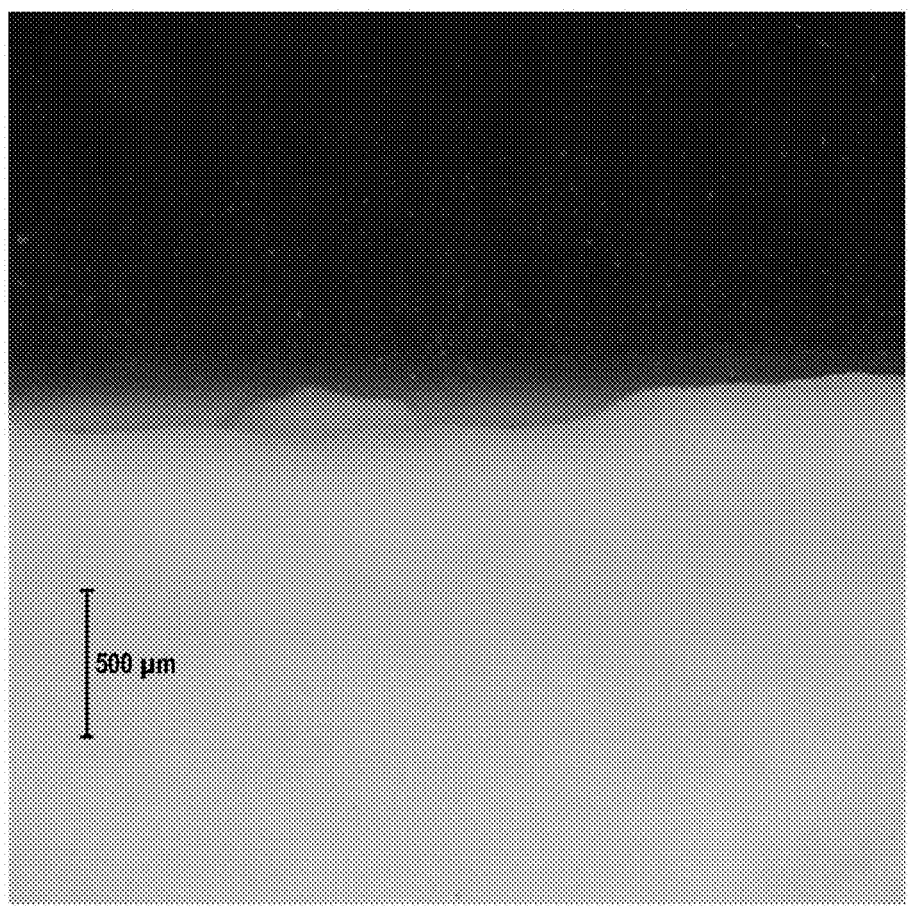
FIG. 8 includes an image of the surface of a component including zircon in accordance with an embodiment.

Note that the zircon components formed according to Examples 2-7 and 12-16, which includes relative low amounts of free silica (i.e., less than 2 wt. % for 3 the total weigh of the zircon body) showed relatively low blistering (i.e., crucible blistering or plaque blistering), especially compared to the zircon component formed according to Example 10. FIG. 8 illustrates an image of the surface of a zircon component formed according to Example 14 showing relatively low blistering.

Referring back to FIG. 3, data points 301 correspond to ratios of the open porosity to density (OP/D) for Examples 3, 12 and 14-18. Data point 302 corresponds to the ratio of open porosity to density (OP/D) for conventional Example 10 and Data point 303 corresponds to the ratio of open porosity to density (OP/D) for conventional Example 11.

The present application represents a departure from the state of the art. Notably, the embodiments herein demonstrate improved and unexpected performance over zircon components formed according to conventional methods. While not wishing to be bound to a particular theory, it is suggested that the combination of certain processes, including for example, milling processes may facilitate the formation of a raw material that is particular suited to forming a component having a unique combination of features, including but not limited to, free silica distribution, free silica content in the finally formed zircon component, apparent porosity of the finally formed zircon component, blistering, and mechanical characteristics of the finally formed zircon component, including fracture toughness (K1c), modulus of rupture (MoR), density, modulus or elasticity (MoE) and Vickers hardness.

Note that not all of the activities described above in the general description or the examples are required, that a portion of a specific activity may not be required, and that one or more further activities may be performed in addition to those described. Still further, the orders in which activities are listed are not necessarily the order in which they are performed. Any values of properties or characteristics of the embodiments herein can represent average or median values derived from a statistically relevant sample size. Unless otherwise stated, it will be appreciated that compositions are based on a total of 100% and the total content of the components does not exceed 100%.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises", "comprising", "includes", "including", "has", "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

Item 1. A component comprising: a body comprising zircon grains, the body having an outer portion and an interior portion; and a free silica intergranular phase present between the zircon grains and distributed substantially uniformly through the body; wherein the body comprises a content of free silica of not greater than about 2 wt. % for a total weight of the body.

Item 2. A component comprising: a body comprising zircon grains, the body having an outer portion and an interior portion; and a free silica intergranular phase present between the zircon grains; wherein the body comprises a content of free silica of not greater than about 2 wt. % for a total weight of the body; and wherein a ratio of $P_{op}/P_{ip}$ is not greater than about 2, wherein $P_{op}$ represents the apparent porosity of the outer portion of the body measured in volume percent, and $P_{ip}$ represents the porosity of the interior portion of the body measured in percent volume.

Item 3. A component comprising: a body comprising zircon grains, the body having an outer portion and an interior portion; and a free silica intergranular phase present between the zircon grains; wherein the body comprises a content of free silica of not greater than about 2 wt. % for a total weight of the body; and wherein the body comprises at least one characteristic selected from the group consisting of: a fracture toughness (K1c) of greater than about 1.55 MPa·m$^{-0.5}$; a modulus of rupture (MoR) of greater than about 60 MPa; a density of greater than about 4.0 g/cm$^3$; a modulus or elasticity (MoE) of greater than about 175 GPa; a Vickers hardness of greater than about 6.0 GPA; and a combination thereof.

Item 4. A component comprising: a body comprising zircon grains, the body having an outer portion and an interior portion; and an free silica intergranular phase present between the zircon grains; wherein the body comprises a content of free silica of not greater than about 2 wt. % for a total weight of the body; and wherein the body has a dynamic corrosion rate of not greater than about 100 μm/day.

Item 5. A component comprising: a body comprising zircon grains, the body having an outer portion and an interior portion; and a free silica intergranular phase present between the zircon grains; wherein the body comprises a content of free silica of not greater than about 2 wt. % for a total weight of the body; and wherein the intergranular phase comprises interconnectivity in the outer portion of the body greater than about 10%.

Item 6. The component of any one of the items 2, 3, 4 or 5, wherein the free silica is distributed substantially uniformly through the body.

Item 7. The component of any one of the items 1, 2, 3, 4, or 5, wherein the K1c of the body is greater than about 1.6 MPa·m$^{-0.5}$, 1.65 MPa·m$^{-0.5}$, 1.7 MPa·m$^{-0.5}$, 1.8 MPa·m$^{-0.5}$, 1.9 MPa·m$^{-0.5}$, 2.0 MPa·m$^{-0.5}$, 2.1 MPa·m$^{-0.5}$, 2.2 MPa·m$^{-0.5}$, 2.3 MPa·m$^{-0.5}$, 2.4 MPa·m$^{-0.5}$, 2.5 MPa·m$^{-0.5}$, 2.6 MPa·m$^{-0.5}$, 2.7 MPa·m$^{-0.5}$, 2.8 MPa·m$^{-0.5}$, 2.9 MPa·m$^{-0.5}$, 3.0 MPa·m$^{-0.5}$, 3.1 MPa·m$^{-0.5}$, 3.2 MPa·m$^{-0.5}$, 3.3 MPa·m$^{-0.5}$, 3.4 MPa·m$^{-0.5}$, 3.5 MPa·m$^{-0.5}$, 3.6 MPa·m$^{-0.5}$, 3.7 MPa·m$^{-0.5}$, 3.8 MPa·m$^{-0.5}$, 3.9 MPa·m$^{-0.5}$ and 4.0 MPa·m$^{-0.5}$.

Item 8. The component of any one of the items 1, 2, 3, 4, or 5, wherein the K1c of the body is not greater than about 4.5 MPa·m$^{-0.5}$, 4.0 MPa·m$^{-0.5}$, 3.5 MPa·m$^{-0.5}$, 3.4 MPa·m$^{-0.5}$, 3.3 MPa·m$^{-0.5}$, 3.2 MPa·m$^{-0.5}$, 3.1 MPa·m$^{-0.5}$, 3.0 MPa·m$^{-0.5}$, 2.9 MPa·m$^{-0.5}$, 2.8 MPa·m$^{-0.5}$, 2.7 MPa·m$^{-0.5}$, 2.6 MPa·m$^{-0.5}$, 2.5 MPa·m$^{-0.5}$, 2.4 MPa·m$^{-0.5}$, 2.3 MPa·m$^{-0.5}$, 2.2 MPa·m$^{-0.5}$, 2.1 MPa·m$^{-0.5}$, 2.0 MPa·m$^{-0.5}$, 1.9 MPa·m$^{-0.5}$, 1.8 MPa·m$^{-0.5}$, 1.7 MPa·m$^{-0.5}$, 1.65 MPa·m$^{-0.5}$ and 1.6 MPa·m$^{-0.5}$.

Item 9. The component of any one of the items 1, 2, 3, 4, or 5, wherein the body has a Vickers hardness greater than about 6.0 GPa, 6.1 GPa, 6.2 GPa, 6.3 GPa, 6.4 GPa, 6.5 GPa, 6.6 GPa, 6.7 GPa, 6.8 GPa, 6.9 GPa, 7.0 GPa, 7.1 GPa, 7.2 GPa, 7.3 GPa, 7.4 GPa, 7.5 GPa, 7.6 GPa, 7.7 GPa, 7.8 GPa and 7.9 GPa.

Item 10. The component of any one of the items 1, 2, 3, 4, or 5, wherein the body has a Vickers hardness not greater than about 8.0 GPa, 7.9 GPa, 7.8 GPa, 7.7 GPa, 7.6 GPa, 7.5 GPa, 7.4 GPa, 7.3 GPa, 7.2 GPa, 7.1 GPa, 7.0 GPa, 6.9 GPa, 6.8 GPa, 6.7 GPa, 6.6 GPa, 6.5 GPa, 6.4 GPa, 6.3 GPa, 6.2 GPa and 6.1 GPa.

Item 11. The component of any one of the items 1, 2, 3, 4, or 5, wherein the body comprises a content of free silica not greater than about 1.9 wt. %, 1.8 wt. %, 1.7 wt. %, 1.6 wt. %, 1.5 wt. %, 1.4 wt. %, 1.3 wt. %, 1.2 wt. %, 1.1 wt. %, 1.0 wt. %, 0.9 wt. %, 0.8 wt. %, 0.7 wt. %, 0.6 wt. %, 0.5 wt. %, 0.4 wt. %, 0.3 wt. % and 0.2 wt. % for a total weight of the body.

Item 12. The component of any one of the items 1, 2, 3, 4, or 5, wherein the body comprises a content of free silica greater than about 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1.0 wt. %, 1.1 wt. %, 1.2 wt. %, 1.3 wt. %, 1.4 wt. %, 1.5 wt. %, 1.6 wt. %, 1.7 wt. %, 1.8 wt. % and 1.9 wt. % for a total weight of the body.

Item 13. The component of any one of the items 1, 2, 3, 4, or 5, wherein the body comprises a sintering aid.

Item 14. The component of item 13, wherein the body comprises a content of sintering aid greater than about 0.2 wt. %, 0.3 wt. %, 0.4 wt. %, 0.5 wt. %, 0.6 wt. %, 0.7 wt. %, 0.8 wt. %, 0.9 wt. %, 1.0 wt. %, 1.1 wt. %, 1.2 wt. %, 1.3 wt. % and 1.4 wt. % for a total weight of the body.

Item 15. The component of item 13, wherein the body comprises a content of sintering aid not greater than about 1.5 wt. %, 1.4 wt. %, 1.3 wt. %, 1.2 wt. %, 1.1 wt. %, 1.0 wt. %, 0.9 wt. %, 0.8 wt. %, 0.7 wt. %, 0.6 wt. %, 0.5 wt. %, 0.4 wt. % and 0.3 wt. % for a total weight of the body.

Item 16. The component of item 13, wherein the body comprises a ratio of $CB_{SA}/CB_{FS}$ of not greater than about 15, 10, 5, 1, 0.5, 0.4, 0.3, 0.2 and 0.1, wherein $CB_{SA}$ represents a content of sintering aid in wt. % for a total weight of the body, and $CB_{FS}$ represents a content of free silica in wt. % for the total weight of the body.

Item 17. The component of item 13, wherein the body comprises a ratio $CB_{SA}/CB_{FS}$ of greater than about 0.05, 0.1, 0.2, 0.3, 0.4, 0.5, 1, 5, 10 and 14, wherein $CB_{SA}$ represents a content of sintering aid in wt. % for a total weight of the body, and $CB_{FS}$ represents a content of free silica in wt. % for the total weight of the body.

Item 18. The component of item 13, wherein the sintering aid is selected from the group consisting of $Ta_2O_5$, $TiO_2$, $Nb_2O_5$, $Fe_2O_3$ and a combination thereof, wherein the sintering aid consists essentially of $Ta_2O_5$.

Item 19. The component of any one of the items 1, 2, 3, 4, or 5, wherein the body comprises a content of $Al_2O_3$ not greater than about 0.5 wt. %, 0.45 wt. %, 0.4 wt. %, 0.35 wt. %, 0.3 wt. %, 0.25 wt. %, 0.2 wt. %, 0.15 wt. %, 0.1 wt. % and 0.05 wt. % for a total weight of the body.

Item 20. The component of any one of the items 1, 2, 3, 4, or 5, wherein the body comprises a content of $Al_2O_3$ greater than about 0.01 wt. %, 0.05 wt. % and 0.1 wt. % for a total weight of the body.

Item 21. The component of any one of the items 1, 2, 3, 4, or 5, wherein the body comprises a content of $Al_2O_3$ not greater than about 0.5 wt. %, 0.45 wt. %, 0.4 wt. %, 0.35 wt. %, 0.3 wt. %, 0.25 wt. %, 0.2 wt. %, 0.15 wt. %, 0.1 wt. %, 0.05 wt. % and 0.01 wt. % for a total weight of zircon grains in the body.

Item 22. The component of any one of the items 1, 2, 3, 4, or 5, wherein the body comprises a content of $Al_2O_3$ greater than about 0.001 wt. %, 0.01 wt. %, 0.05 wt. % and 0.1 wt. % for a total weight of zircon grains in the body.

Item 23. The component of any one of the items 1, 2, 3, 4, or 5, wherein the body comprises a ratio of $CB_{Al2O3}/CB_{FS}$ of not greater than about 5, 3, 1, 0.5, 0.4, 0.3, 0.2, 0.1, 0.01 and 0.005, wherein $CB_{Al2O3}$ represents a content of $Al_2O_3$ in wt. % for a total weight of the body, and $CB_{FS}$ represents a content of free silica in wt. % for the total weight of the body.

Item 24. The component of any one of the items 1, 2, 3, 4, or 5, wherein the body comprises a ratio of $CB_{Al2O3}/CB_{FS}$ of greater than about 0.0025, 0.005, 0.01, 0.1, 0.2, 0.3, 0.4, 0.5, 0.6, 0.7, 0.8 and 0.9, wherein $CB_{Al2O3}$ represents a content of $Al_2O_3$ in wt. % for a total weight of the body, and $CB_{FS}$ represents a content of free silica in wt. % for the total weight of the body.

Item 25. The component of any one of the items 1, 2, 3, 4, or 5, wherein the body comprises a ratio of $CB_{Al2O3}/CB_{ZrSiO4}$ of not greater than about 0.007, 0.006, 0.005, 0.004, 0.003, 0.002 and 0.001, wherein $CB_{Al2O3}$ represents a content of $Al_2O_3$ in wt. % for a total weight of the body, and $CB_{ZrSiO4}$ represents a content of $ZrSiO_4$ in wt. % for the total weight of the body.

Item 26. The component of any one of the items 1, 2, 3, 4, or 5, wherein the body comprises a ratio of $CB_{Al2O3}/CB_{ZrSiO4}$ of greater than about 0.0001, 0.001, 0.002, 0.003, 0.004, 0.005 and 0.006, wherein $CB_{Al2O3}$ represents a content of $Al_2O_3$ in wt. % for a total weight of the body, and $CB_{ZrSiO4}$ represents a content of $ZrSiO_4$ in wt. % for the total weight of the body.

Item 27. The component of any one of the items 1, 2, 3, 4, or 5, wherein the zircon grains are formed from processed zircon particles.

Item 28. The component of item 27, wherein the zircon particles are milled.

Item 29. The component of item 27, wherein the zircon particles have a median grain size (D50) of greater than about 1 μm, 2 μm, 3 μm, 4 μm, 5 μm, 6 μm, 7 μm, 8 μm, 9 μm, 10 μm, 12 μm and 14 μm.

Item 30. The component of item 27, wherein the zircon particles have a median grain size (D50) of not greater than about 15 μm, 14 μm, 12 μm, 10 μm, 9 μm, 8 μm, 7 μm, 6 μm, 5 μm, 4 μm, 3 μm, 2 μm and 1 μm.

Item 31. The component of item 27, wherein the zircon particles have a D90 grain size of not greater than about 40 μm, 30 μm, 20 μm, 15 μm and 10 μm.

Item 32. The component of item 27, wherein the zircon particles have a D90 grain size of greater than about 5 μm, 10 μm, 15 μm, 20 μm and 30 μm.

Item 33. The component of item 27, wherein the zircon particles have a D10 grain size of greater than about 0.2 μm, 0.5 μm, 0.8 μm and 1.0 μm.

Item 34. The component of item 27, wherein the zircon particles have a D10 grain size of not greater than about 1.1 μm, 1.0 μm, 0.8 μm, and 0.5 μm.

Item 35. The component of item 27, wherein the zircon grains have a median grain size (D50) of greater than about 1 μm, 2 μm, 3 μm, 4 μm, 5 μm, 6 μm, 7 μm, 8 μm, 9 μm, 10 μm, 12 μm and 14 μm.

Item 36. The component of item 27, wherein the zircon grains have a median grain size (D50) of not greater than about 20 μm, 19 μm, 18 μm, 17 μm, 16 μm, 15 μm, 14 μm, 13 μm, 12 μm and 10 μm.

Item 37. The component of any one of the items 1, 2, 3, 4, or 5, wherein the body comprises a content of zircon greater than about 95 wt. %, 96 wt. %, 97 wt. %, 98 wt. %, 99 wt. % and 99.5 wt. % for a total weight of the body.

Item 38. The component of any one of the items 1, 2, 3, 4, or 5, wherein the body comprises a content of zircon not greater than about 99.9 wt. %, 99.5 wt. %, 99 wt. %, 98 wt. %, 97 wt. % and 96 wt. % for a total weight of the body.

Item 39. The component of any one of the items 1, 2, 3, 4, or 5, wherein the body has a density greater than about 4 g/cm$^3$, 1 g/cm$^3$, 4.2 g/cm$^3$, 4.3 g/cm$^3$ and 4.4 g/cm$^3$.

Item 40. The component of any one of the items 1, 2, 3, 4, or 5, wherein the body has a density not greater than about 4.5 g/cm$^3$, 4.4 g/cm$^3$, 4.3 g/cm$^3$, 4.2 g/cm$^3$ and 4.1 g/cm$^3$.

Item 41. The component of any one of the items 1, 2, 3, 4, or 5, wherein the body has a creep strain rate of not greater than about 50 ppm/h measured at 1300° C., 40 ppm/h measured at 1300° C., 30 ppm/h measured at 1300° C., 20 ppm/h measured at 1300° C., 10 ppm/h measured at 1300° C., 5 ppm/h measured at 1300° C., 3 ppm/h measured at 1300° C., 1.5 ppm/h measured at 1300° C., 1.0 ppm/h measured at 1300° C., 0.5 ppm/h measured at 1300° C. and 0.25 ppm/h measured at 1300° C.

Item 42. The component of any one of the items 1, 2, 3, 4, or 5, wherein the body has a creep strain rate of not greater than about 30 ppm/h measured at 1275° C., 20 ppm/h measured at 1275° C., 10 ppm/h measured at 1275° C. and 5 ppm/h measured at 1275° C.

Item 43. The component of item 2, wherein the body comprises a ratio of $P_{op}/P_{ip}$ of not greater than about 1.9, 1.8, 1.7, 1.6, 1.5, 1.4, 1.3, 1.2 and 1.1.

Item 44. The component of item 2, wherein the body comprises a ratio of $P_{op}/P_{ip}$ of about 1.

Item 45. The component of item 2, wherein the body comprises a ratio of $P_{op}/P_{ip}$ of greater than about 0.8, 0.85, 0.9 and 0.95.

Item 46. The component of item 2, wherein the outer portion of the body can extend to a depth not greater than about 5000 μm from an outside surface of the body.

Item 47. The component of any one of the items 1, 2, 3, 4, or 5, wherein the body comprises a content of rare earth oxides not greater than about 1 wt. % for a total weight of the body.

Item 48. The component of any one of the items 1, 2, 3, 4, or 5, wherein the body comprises a content of alkali oxides not greater than about 1 wt. % for a total weight of the body.

Item 49. The component of any one of the items 1, 2, 3, 4, or 5, wherein the body comprises a content of alkali earth oxides not greater than about 1 wt. % for a total weight of the body.

Item 50. The component of any one of the items 1, 2, 3, 4, or 5, wherein the body comprises a content of $B_2O_3$ not greater than about 1 wt. % for a total weight of the body.

Item 51. The component of any one of the items 1, 2, 3, 4, or 5, wherein the body comprises a content of a compound from the group consisting of $H_2SiF_6$, $K_2SiF_6$ and $(NH_4)_2SiF_6$, of not greater than about 0.5 wt. %, 0.4 wt. %, 0.3 wt. %, 0.2 wt. %, 0.01 wt. % and 0.001 wt. % of a total weight of the body.

Item 52. The component of any one of the items 1, 2, 3, 4, or 5, wherein the free silica intergranular phase comprises interconnectivity in the outer portion of the body greater than about 15%, 20%, 25%, 30%, 35%, 40%, 45%, 50%, 55%, 60%, 65%, 70%, 75%, 80%, 85%, 90% and 95%.

Item 53. The component of any one of the items 1, 2, 3, 4, or 5, wherein the free silica intergranular phase comprises interconnectivity in the outer portion of the body not greater than about 100%, 95%, 90%, 85%, 80%, 75%, 70%, 65%, 60%, 55%, 50%, 45%, 40%, 35%, 30%, 25%, 20%, and 15%.

Item 54. The component of any one of the items 1, 2, 3, 4, or 5, wherein body comprises a ratio of $IC_{op}/IC_{ip}$ of greater than about 0.8, 0.85, 0.9, 0.95 and 0.99, wherein $IC_{op}$ represents an interconnectivity of the free silica intergranular phase in the outer portion of the body and $IC_{ip}$ represents an interconnectivity of the free silica intergranular phase in the inner portion of the body.

Item 55. The component of any one of the items 1, 2, 3, 4, or 5, wherein the body comprises a ratio of $IC_{op}/IC_{ip}$ of about 1.0, wherein $IC_{op}$ represents an interconnectivity of the free silica intergranular phase in the outer portion of the body and $IC_{ip}$ represents an interconnectivity of the free silica intergranular phase in the inner portion of the body.

Item 56. A method for forming a zircon component comprising: providing a raw material powder comprising zircon grains; and sintering the raw material to create a body comprising zircon grains and a free silica intergranular phase present between the zircon grains and distributed substantially uniformly through the body.

Item 57. The method of item 56, wherein the raw material powder comprises a content of free silica not greater than about 2.0 wt. %, 1.9 wt. %, 1.8 wt. %, 1.7 wt. %, 1.6 wt. %, 1.5 wt. %, 1.4 wt. %, 1.3 wt. %, 1.2 wt. %, 1.1 wt. %, 1.0 wt. %, 0.9 wt. %, 0.8 wt. %, 0.7 wt. %, 0.6 wt. %, 0.5 wt. %, 0.4 wt. %, 0.3 wt. % and 0.2 wt. % for a total weight of raw material powder.

Item 58. The method of item 56, wherein the raw material powder comprises a content of free silica greater than about 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1.0 wt. %, 1.1 wt. %, 1.2 wt. %, 1.3 wt. %, 1.4 wt. %, 1.5 wt. %, 1.6 wt. %, 1.7 wt. %, 1.8 wt. % and 1.9 wt. % for a total weight of the raw material.

Item 59. The method of item 56, wherein the raw material powder comprises a content of $Al_2O_3$ not greater than about 0.5 wt. %, 0.45 wt. %, 0.4 wt. %, 0.35 wt. %, 0.3 wt. %, 0.25 wt. %, 0.2 wt. %, 0.15 wt. %, 0.1 wt. % and 0.05 wt. % for a total weight of the raw material powder.

Item 60. The method of item 56, wherein the raw material powder comprises a content of $Al_2O_3$ greater than about 0.01 wt. %, 0.05 wt. %, 0.1 wt. %, 0.15 wt. %, 0.2 wt. %, 0.25 wt. %, 0.3 wt. %, 0.35 wt. %, 0.4 wt. % and 0.45 wt. % for a total weight of the raw material powder.

Item 61. The method of item 56, wherein the raw material powder comprises a content of $Al_2O_3$ not greater than about 0.5 wt. %, 0.45 wt. %, 0.4 wt. %, 0.35 wt. %, 0.3 wt. %, 0.25 wt. %, 0.2 wt. %, 0.15 wt. %, 0.1 wt. %, 0.05 wt. % and 0.01 wt. % for a total weight of the zircon grains in the raw material powder.

Item 62. The method of item 56, wherein the raw material powder comprises a content of $Al_2O_3$ greater than about 0.001 wt. %, 0.01 wt. %, 0.05 wt. %, 0.1 wt. %, 0.15 wt. %, 0.2 wt. %, 0.25 wt. %, 0.3 wt. %, 0.35 wt. %, 0.4 wt. % and 0.45 wt. % for a total weight of the zircon grains in the raw material powder.

Item 63. The method of item 56, wherein the raw material powder comprises a ratio of $CP_{Al2O3}/CP_{FS}$ of not greater than about 5, 3, 1, 0.5, 0.4, 0.3, 0.2, 0.1, 0.01 and 0.005, wherein $CP_{Al2O3}$ represents a content of $Al_2O_3$ in wt. % for a total weight of the raw material powder, and $CP_{FS}$ represents a content of free silica in wt. % for the total weight of the raw material powder.

Item 64. The method of item 56, wherein the raw material powder comprises a ratio of $CP_{Al2O3}/CP_{FS}$ of greater than about 0.0025, 0.005, 0.01, 0.1, 0.2, 0.3, 0.4, 0.5, 0.6, 0.7, 0.8 and 0.9, wherein $CP_{Al2O3}$ represents a content of $Al_2O_3$ in wt. % for a total weight of the raw material powder, and $CP_{FS}$ represents a content of free silica in wt. % for the total weight of the raw material powder.

Item 65. The method of item 56, wherein the raw material powder comprises a ratio of $CP_{Al2O3}/CP_{ZrSiO4}$ of not greater than about 0.007, 0.006, 0.005, 0.004, 0.003, 0.002 and 0.001, wherein $CP_{Al2O3}$ represents a content of $Al_2O_3$ in wt. % for a total weight of the raw material powder, and $CP_{ZrSiO4}$ represents a content of $ZrSiO_4$ in wt. % for the total weight of the raw material powder.

Item 66. The method of item 56, wherein the raw material powder comprises a ratio of $CP_{Al2O3}/CP_{ZrSiO4}$ of greater than about 0.0005, 0.001, 0.002, 0.003, 0.004, 0.005, and 0.006, wherein $CP_{Al2O3}$ represents a content of $Al_2O_3$ in wt.

% for a total weight of the raw material powder, and $CP_{ZrSiO4}$ represents a content of $ZrSiO_4$ in wt. % for the total weight of the raw material powder.

Item 67. The method of item 56, wherein providing a raw material powder comprises milling the raw material powder.

Item 68. The method of item 67, wherein the raw material powder is milled to a median grain size (D50) of not greater than about 15 μm, 14 μm, 12 μm, 10 μm, 9 μm, 8 μm, 7 μm, 6 μm, 5 μm, 4 μm, 3 μm, 2 μm and 1 μm.

Item 69. The method of item 67, wherein the raw material powder is milled to a median grain size (D50) of greater than about 2 μm, 3 μm, 4 μm, 5 μm, 6 μm, 7 μm, 8 μm, 9 μm, 10 μm, 12 μm and 14 μm.

Item 70. The method of item 67, wherein the raw material powder is controlled to have a D90 grain size of not greater than about 40 μm, 30 μm, 20 μm, 15 μm and 10 μm.

Item 71. The method of item 67, wherein the raw material powder is controlled to have a D90 grain size of greater than about 5 μm, 10 μm, 15 μm, 20 μm and 30 μm.

Item 72. The method of item 67, wherein the raw material powder is controlled to have a D10 grain size of greater than about 0.2 μm, 0.5 μm, 0.8 μm and 1.0 μm.

Item 73. The method of item 67, wherein the raw material powder is controlled to have a D10 grain size of not greater than about 1.1 μm, 1.0 μm, 0.8 μm, and 0.5 μm.

Item 74. The method of item 56 further comprising providing a sintering aid, and combining the raw material powder with the sintering aid to form a combined material mixture prior to sintering the raw material.

Item 75. The method of item 74, wherein the combined material mixture comprises a content of sintering aid of greater than about 0.5 wt. %, 0.6 wt. %, 0.7 wt. %, 0.8 wt. %, 0.9 wt. %, 1.0 wt. %, 1.1 wt. %, 1.2 wt. %, 1.3 wt. % and 1.4 wt. % for a total weight of the combined material mixture.

Item 76. The method of item 74, wherein the combined material mixture comprises a content of sintering aid not greater than about 1.5 wt. %, 1.4 wt. %, 1.3 wt. %, 1.2 wt. %, 1.1 wt. %, 1.0 wt. %, 0.9 wt. %, 0.8 wt. %, 0.7 wt. %, 0.6 wt. %, 0.5 wt. %, 0.4 wt. % and 0.3 wt. % for a total weight of the combined material mixture.

Item 77. The method of item 74, wherein the combined material mixture comprises a ratio of $CP_{SA}/CP_{FS}$ of not greater than about 15, 10, 5, 1, 0.5, 0.4, 0.3, 0.2 and 0.1, wherein $CP_{SA}$ represents a content of sintering aid in wt. % for a total weight of the combined material mixture, and $CP_{FS}$ represents a content of free silica in wt. % for the total weight of the combined material mixture.

Item 78. The method of item 74, wherein the combined material mixture comprises a ratio of $CP_{SA}/CP_{FS}$ of greater than about 0.05, 0.1, 0.2, 0.3, 0.4, 0.5, 1, 5, 10 and 14, wherein $CP_{SA}$ represents a content of sintering aid in wt. % for a total weight of the combined material mixture, and $C_{FS}$ represents a content of free silica in wt. % for the total weight of the combined material mixture.

Item 79. The method of item 74, wherein the sintering aid is selected from the group consisting of $Ta_2O_5$, $TiO_2$, $Nb_2O_5$, $Fe_2O_3$ and a combination thereof, wherein the sintering aid consists essentially of $Ta_2O_5$.

Item 80. The method of item 74, further comprising spray drying the combined material mixture prior to sintering combined material mixture.

Item 81. The method of item 80 further comprising iso-statically pressing the spray dried combined material mixture to form a blank.

Item 82. The method of item 81, wherein the dried combined material mixture is pressed at a pressure greater than about 50 MPa, 60 MPa, 70 MPa, 80 MPa, 90 MPa, 100 MPa, 110 MPa, 120 MPa, 130 MPa, 140 MPa and 150 MPa.

Item 83. The method of item 81, wherein the blank has at least one dimension larger than about 100 mm, 200 mm, 300 mm, 400 mm, 500 mm, 600 mm, 700 mm and 800 mm.

Item 84. The method of item 56, wherein sintering the raw material comprises heating the raw material.

Item 85. The method of item 84, wherein heating the raw material comprises heating the raw material for a heating cycle duration of greater than about 30 days, 35 days, 40 days, 45 days, 50 days, 55 days, 60 days, 65 days, 70 days, 75 days, 80 days and 85 days.

Item 86. The method of item 84, wherein heating the raw material comprises heating the raw material for a heating cycle duration of not greater than about 90 days, 85 days, 80 days, 75 days, 70 days, 65 days, 60 days, 55 days, 50 days, 45 days and 40 days.

Item 87. The method of item 84, wherein heating the raw material comprises heating the raw material at a temperature of greater than about 1500° C., 1550° C. and 1600° C.

Item 88. The method of item 84, wherein heating the raw material comprises heating the raw material at a temperature of not greater than about 1650° C., 1600° C., and 1550° C.

Item 89. The component of any one of the items 1, 2, 3, 4, or 5, wherein the body comprises an open porosity of not greater than about 10 vol. %, 9 vol. %, 8 vol. %, 7 vol. %, 6 vol. %, 5 vol. %, 4 vol. %, 3 vol %, 2 vol. %, 1 vol. %, 0.5 vol % , and 0.1 vol % for the total volume of the body.

Item 90. The component of any one of the items 1, 2, 3, 4, or 5, wherein the body comprises an open porosity of at least about 0.001 vol. %, 0.01 vol. %, 0.1 vol. %, 0.5 vol. %, 1 vol. %, 2 vol. %, 3 vol. %, 4 vol %, 5 vol. %, 6 vol. %, 7 vol %, and 8 vol % for the total volume of the body.

Item 91. The component of any one of the items 1, 2, 3, 4, or 5, wherein the body comprises an open porosity/density zero point (PDZP) of at least about 154, wherein PDZP is defined by the equation PDZP=OP+35.844*D, where D is the density of the body and OP is the open porosity of the body.

Item 92. The component of item 91, wherein the body comprises an open porosity/density zero point (PDZP) of at least about 155, at least about 156, at least about 157 and at least about 158.

Item 93. The component of any one of the items 1, 2, 3, 4, or 5, wherein the body comprises an open porosity/density zero point (PDZP) of not greater than about 159, wherein PDZP is defined by the equation PDZP=OP+35.844*D, where D is the density of the body and OP is the open porosity of the body.

Item 94. The component of item 93, wherein the body comprises an open porosity/density zero point (PDZP) of not greater than about 158, not greater than about 157, not greater than about 156 and not greater than about 155.

What is claimed is:

1. A component comprising:
a body comprising zircon grains, the body having an outer portion and an interior portion;
a free silica intergranular phase present between the zircon grains and distributed substantially uniformly through the body;
a zircon content of greater than about 96 wt. % of a total weigh of the body; and
a $TiO_2$ content of greater than 0.2 wt. % of a total weigh of the body;
wherein the body comprises a content of free silica of not greater than about 2 wt. % for a total weight of the body.

2. The component of claim 1, wherein the body comprises a sintering aid and wherein the body further comprises a ratio of $CB_{SA}/CB_{FS}$ of not greater than about 15, wherein $CB_{SA}$ represents a content of sintering aid in wt. % for a total weight of the body, and $CB_{FS}$ represents a content of free silica in wt. % for the total weight of the body.

3. The component of claim 2, wherein the sintering aid is selected from the group consisting of $Ta_2O_5$, $TiO_2$, $Nb_2O_5$, $Fe_2O_3$ and a combination thereof.

4. The component of claim 1, wherein the body comprises a content of $Al_2O_3$ not greater than about 0.5 wt. % for a total weight of the body.

5. The component of claim 1, wherein the body comprises a ratio of $CB_{Al2O3}/CB_{FS}$ of not greater than about 5, wherein $CB_{Al2O3}$ represents a content of $Al_2O_3$ in wt. % for a total weight of the body, and $CB_{FS}$ represents a content of free silica in wt. % for the total weight of the body.

6. The component of claim 1, wherein the body comprises a ratio of $CB_{Al2O3}/CB_{ZrSiO4}$ of not greater than about 0.007, wherein $CB_{Al2O3}$ represents a content of $Al_2O_3$ in wt.% for a total weight of the body, and $CB_{ZrSiO4}$ represents a content of $ZrSiO_4$ in wt. % for the total weight of the body.

7. The component of claim 1, wherein the body has a creep strain rate of not greater than about 50 ppm/h measured at 1300° C.

8. The component of claim 1, wherein the body comprises a content of rare earth oxides not greater than about 1 wt. % for a total weight of the body.

9. The component of claim 1, wherein the body comprises a content of alkali oxides not greater than about 1 wt. % for a total weight of the body.

10. The component of claim 1, wherein the body comprises a content of $B_2O_3$ not greater than about 1 wt. % for a total weight of the body.

11. The component of claim 1, wherein the body comprises a content of a compound from the group consisting of $H_2SiF_6$, $K_2SiF_6$ and $(NH_4)_2SiF_6$, of not greater than about 0.5 wt. % of a total weight of the body.

12. The component of claim 1, wherein the body comprises a content of zircon greater than about 98 wt. % for a total weight of the body.

13. The component of claim 1, wherein the body comprises a content of zircon not greater than about 99.5 wt. % for a total weight of the body.

14. The component of claim 1, wherein the body has a density greater than about 4.1 g/cm$^3$.

15. The component of claim 1, wherein the body has a density not greater than about 4.5 g/cm$^3$.

16. The component of claim 1, wherein the free silica intergranular phase comprises interconnectivity in the outer portion of the body greater than about 15%.

17. The component of claim 1, wherein the free silica intergranular phase comprises interconnectivity in the outer portion of the body not greater than about 100%.

18. The component of claim 1, wherein body comprises a ratio of $IC_{op}/IC_{ip}$ of greater than about 0.8, wherein $IC_{op}$ represents an interconnectivity of the free silica intergranular phase in the outer portion of the body and $IC_{ip}$ represents an interconnectivity of the free silica intergranular phase in the inner portion of the body.

19. The component of claim 1, wherein the body comprises a ratio of $IC_{op}/IC_{ip}$ of about 1.0, wherein $IC_{op}$ represents an interconnectivity of the free silica intergranular phase in the outer portion of the body and $IC_{ip}$ represents an interconnectivity of the free silica intergranular phase in the inner portion of the body.

* * * * *